US010023307B2

(12) United States Patent
Deng et al.

(10) Patent No.: US 10,023,307 B2
(45) Date of Patent: Jul. 17, 2018

(54) ELECTROMAGNETIC ACTUATOR SYSTEM WITH A ROTOR OSCILLATION

(71) Applicant: Purdue Research Foundation, West Lafayette, IN (US)

(72) Inventors: Xinyan Deng, Lafayette, IN (US); Bo Cheng, West Lafayette, IN (US); Jesse Aaron Roll, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 463 days.

(21) Appl. No.: 14/203,518

(22) Filed: Mar. 10, 2014

(65) Prior Publication Data

US 2016/0185455 A1 Jun. 30, 2016

Related U.S. Application Data

(60) Provisional application No. 61/774,793, filed on Mar. 8, 2013.

(51) Int. Cl.
| | |
|---|---|
| H02K 33/16 | (2006.01) |
| B64C 33/02 | (2006.01) |
| B64C 39/02 | (2006.01) |
| H02K 7/00 | (2006.01) |
| B60L 1/00 | (2006.01) |

(52) U.S. Cl.
CPC ............ *B64C 33/02* (2013.01); *B60L 1/00* (2013.01); *B64C 39/024* (2013.01); *B64C 39/028* (2013.01); *H02K 7/003* (2013.01); *H02K 33/16* (2013.01); *B64C 2201/025* (2013.01); *B64C 2201/042* (2013.01)

(58) Field of Classification Search
CPC ........ H02K 7/003; H02K 33/16; B64C 33/02; B64C 39/024; B64C 39/028
USPC ........................................................... 310/38
See application file for complete search history.

(56) References Cited

U.S. PATENT DOCUMENTS

| | | | | |
|---|---|---|---|---|
| 3,309,988 | A | * | 3/1967 | Touchman ................. B41J 1/46 310/105 |
| 2004/0195436 | A1 | * | 10/2004 | Sinclair ................ A63H 27/008 244/49 |
| 2006/0028751 | A1 | * | 2/2006 | Takeuchi ............... H02K 33/16 |

(Continued)

OTHER PUBLICATIONS

SN Fry, R Sayaman, MH Dickinson. The aerodynamics of free-flight maneuvers in *Drosophila*. Science, 2003, 300:495-498.

(Continued)

*Primary Examiner* — Michael Andrews
(74) *Attorney, Agent, or Firm* — Purdue Research Foundation

(57) ABSTRACT

A novel electromagnetic actuator designed to operate at system resonance, used in the construction of a unique vehicle system, is presented herein. An exemplary embodiment of the vehicle system is based on an electromagnetic actuator coupled to a plurality of actuating members of a micro aerial vehicle. Attributes of this type of actuation offer several enhancements over traditional approaches. The unique use of an electromagnetic actuator lends itself to a near unlimited number of coil cross-sectional designs that can be optimized to meet performance requirements while maintaining minimal costs of fabrication.

14 Claims, 23 Drawing Sheets

(56) References Cited

U.S. PATENT DOCUMENTS

2006/0255664 A1\* 11/2006 Kraus .................... H02K 33/16
310/36

OTHER PUBLICATIONS

A. J. Bergou, L. Ristroph, J. Guckenheimer, I. Cohen, Z. J. Wang. Fruit flies modulate passive wing pitching to generate in-flight turns. Physical Review Letters, 2010,104:148101.
C. Clark. Effects of tail length on an escape maneuver of the red-billed streamertail. Journal of Ornithology, 2011, 152:397-408.
M. H. Dickinson, F.-O. Lehmann, and S. P. Sane. Wing rotation and the aerodynamic basis of insect flight. Science, 1999, 284:1954-1960.
S. P. Sane. The aerodynamics of insect flight. Journal of Experimental Biology, 2003, 206:4191-4208.
T. S. Collett and M.F. Land. Visual control of flight behaviour in the hoverflysyritta pipiens I. Journal of Comparative Physiology A: Neuroethology, Sensory, Neural, and Behavioral Physiology, 1997, 99:1-66.
B. Cheng, X. Deng, and T. L. Hedrick. The mechanics and control of pitching manoeuvres in a freely flying hawkmoth (Manduca sexta). Journal of Experimental Biology, 2011, 214:4092-4106.
B. Singh and I. Chopra. Insect-based hover-capable flapping wings for micro air vehicles: experiments and analysis. AIAA Journal, 2008, 46:2115-2135.
F. Van Breugel, W. Regan, and H. Lipson. From insects to machines. Robotics & Automation Magazine, IEEE, 2008, 15(4):68-74.
T.J. Mueller and J.D. Delaurier. Aerodynamics of small vehicles. Annual review of fluid mechanics, 2003, 35(1):8-111.
Robyn Lynn Hamon, Aerodynamic modeling of a flapping membrane wing using motion tracking experiments. Masters of. Science, 2008. University of Maryland, College Park, MD. Directed by: Langley Distinguished Professor, Dr. James E. Hubbard Jr.
K. C. Hall and S. R. Hall. Minimum induced power requirements for flapping flight. Journal of Fluid Mechanics, 1996, 323:285-315.
T.L. Hedrick. Software techniques for two- and three-dimensional kinematic measurements of biological and biomimetic systems. Bioinspiration and Biomimetics, 2008, 3:034001.
M. F. M. Osbourne. Aerodynamics of flapping flight with application to insects. J. Exp. Biol., 1951, 28:221-245.
T. Weis-Fogh and Martin Jensen. Biology and physics of locust flight. i. basic in insect flight. a critical review. Philosophical Transactions of the Royal Society of London. Seires B, Biological Sciences, 1956, 239(667):415-458.
C. P. Ellington. The aerodynamics of hovering insect flight. i. The quasi-steady analysis. Philosophical Transactions of the Royal Society of London. Series B, Biological Sciences, 1984, 305(1122):1-15.
M. Karpelson, W. Gu-Yeon, R. J. Wood. A review of actuation and power electronics options for flapping-wing robotic insects. IEEE International Conference on Robotics and Automation, 2008. ICRA 2008, pp. 779-796.
E. Steltz, M. Seeman, S. Avadhanula, and R. S. Fearing. Power electronics design choice for piezoelectric microrobots. 2006 IEEE/RSJ International Conference on Intelligent Robots and Systems, 2006, pp. 1322-1328.
R. S. Fearing, K. H. Chiang, M. H. Dickinson, D. L. Pick, M. Sitti, and J. Yan. Wing transmission for a micromechanical flying insect. IEEE International Conference on Robotics and Automation, ICRA 2000, 2:1509-1516.
J. A. Miyan and A. W. Ewing. How diptera move their wings: A re-examination of the wing base articulation and muscle systems concerned with flight. Philosophical Transactions of the Royal Society of London. Series B, Biological Sciences, 1985, 311:271-302.
D. B. Doman, M. W. Oppenheimer, and D. O. Sigthorsson. Wingbeat shape modulation for flapping-wing micro-air-vehicle control during hover. AIAA Journal of Guidance, Control, and Dynamics, 2010, 33:724-739.
C. P. Ellington. The aerodynamics of hovering insect flight. ii. morphological parameters. Philosophical Transactions of the Royal Society of London Series B, Biological Sciences, 1984,305(1122):17-40.
S. P. Sane and M. H. Dickinson. The control of flight force by a flapping wing: lift and drag production. Journal of Experimental Biology, 2001,204:2607-2626.
R. J. Wodd. The first takeoff of a biologically inspired at-scale robotic insect. IEEE Transactions on Robotics, 2008, 24:341-347.
J. P. Whitney and R. J. Wood. Aeromechanics of passive rotation in flapping flight. Journal of Fluid Mechanics, 2010, 660:197-220.
C.-G. Rossgy, On the momentum transfer at the sea surface, I. On the frictional force between air and water and on the occurrence of a laminar boundary layer next to the surface of the sea. 1936, vol. 4(3), 3-30.
David Lentink, Biofluiddynamic scaling of flapping, spinning and translating fins and wings, Journal of Experimental Biology, 2009, 212, 2691-2704.
Peter B. Landecker, et al., An Analytic Solution for the Torque Between Two Magnetic Dipoles, Magnetic and Electrical Separation, 2009, vol. 10, pp. 29-33.

\* cited by examiner

ELECTROMAGNETIC ACTUATOR SYSTEM WITH A ROTOR OSCILLATION

CROSS-REFERENCE TO RELATED APPLICATIONS

The present U.S. patent application is related to and claims the priority benefit of U.S. Provisional Patent Application Ser. No. 61/774,793, filed Mar. 8, 2013, the contents of which are hereby incorporated by reference in its entirety into the present disclosure.

STATEMENT REGARDING GOVERNMENT FUNDING

This invention was made with government support under FA8650-07-2-3744 awarded by the Air Force Research Laboratory and CMMI1100764 awarded by the National Science Foundation. The government has certain rights in the invention.

TECHNICAL FIELD

The present disclosure generally relates to an electromagnetic actuator designed to operate at a configurable frequency and its application to sensing, actuation, robot, vehicle systems, and energy harvesting systems.

BACKGROUND

This section introduces aspects that may help facilitate a better understanding of the disclosure. Accordingly, these statements are to be read in this light and are not to be understood as admissions about what is or is not prior art.

Flying vehicles have commonly found use in various applications. One current embodiment is as a platform using fixed wing structures capable of generating lift through forward propulsion supplied by propellers that are driven by direct current (DC) motors or internal combustion engines. There are also flying vehicles capable of both hovering and forward flight through the use of a single or multiple pairs of rotorcraft-type blades coupled to DC motors. However, by comparison, flapping wing flyers found in nature, while exhibiting the same aforementioned flight capabilities, also possess unparalleled flight maneuverability and agility. Therefore, in these and other applications (e.g., surveillance, mapping, condition monitoring, etc.), efficiency (i.e., battery usage), maneuverability, reliability, longevity, and control (i.e., maneuverability) of all current and future flying vehicles pose challenges. Thus far, no system has provided a solution to the above-enumerated challenges and been able to reproduce the capabilities of nature's flyers.

Therefore, there is an unmet need for an aerial vehicle system driven by an actuation and wing based system specifically designed to be efficient, reliable, long-lasting, and provide the advanced maneuverability and control required to meet the demand of future applications.

SUMMARY

Described herein is an electromagnetic actuator, having an actuator frame, a rotor positioned within the actuator frame and configured to have direct rotational oscillation about a rotation axis following a predetermined rotational arc having a middle position and operatively within a predetermined oscillation frequency range, a stator disposed within the actuator frame positioned proximate to the rotor and configured to remain stationary, combination of the stator and the rotor configured to generate a net driving torque between the rotor and the stator, where the net driving torque is at its maximum when the rotor's rotational position corresponds to the middle position, at least one restoring element configured to provide a net counter torque to the rotor to bias the rotor to rotate to the middle position, where the net counter torque is at its minimum when the rotor's rotational position corresponds to the middle position, at least one set of excitation terminals configured to provide potential energy to generate the net driving torque, and at least one actuating coupling having a proximal end and a distal end, the distal end configured to couple to at least one actuating member and the proximal end configured to couple to the rotor, motion of the rotor causing motion of the at least one actuating member thereby causing motion of the electromagnetic actuator. The potential energy is electrical energy. The predetermined oscillation frequency range is about a resonant mode defined by the rotor, the at least one restoring element, and the at least one actuating member. The stator includes at least one winding. The rotor includes at least one permanent magnet. The restoring element is at least one permanent magnet. The restoring element has an elastic based component. The electromagnetic actuator is configured to be communicatively coupled to at least one sensor.

Also described herein is a vehicle system, having a vehicle frame, at least one electromagnetic actuator, positioned within the vehicle frame, the at least one electromagnetic actuator having an actuator frame, a rotor disposed within the actuator frame and configured to have direct rotational oscillation about a rotation axis following a predetermined rotational arc having a middle position and operatively within a predetermined oscillation frequency range, a stator disposed within the actuator frame positioned proximate to the rotor and configured to remain stationary, combination of the stator and the rotor configured to generate a net driving torque between the rotor and the stator, where the net driving torque is at its maximum when the rotor's rotational position corresponds to the middle position, at least one restoring element configured to provide a net counter torque to the rotor to bias the rotor to rotate to the middle position, where the net counter torque is at its minimum when the rotor's rotational position corresponds to the middle position, at least one set of excitation terminals configured to provide potential energy to generate the net driving torque, and at least one actuating coupling having a proximal end and a distal end, the distal end configured to couple to at least one actuating member and the proximal end configured to couple to the rotor, motion of the rotor causing motion of the at least one actuating member thereby causing motion of the electromagnetic actuator, at least one actuating member, the at least one actuating member configured to couple to the actuating coupling, and a power source, the power source connected to the excitation terminals and providing potential energy to generate the net driving torque. The at least one actuating coupling is configured to enable at least one degree of freedom in the at least one actuating member. Further, the at least one actuating member is an element producing locomotion. The electromagnetic actuated vehicle system is configured to be communicatively coupled to at least one sensor. The at least one sensor has at least one sensor processing and coil drive circuitry unit. Finally, the at least one sensor processing and coil drive circuitry unit is powered by a voltage source, the voltage source coupled to the frame.

BRIEF DESCRIPTION OF THE DRAWINGS

FIG. 4b is an illustration of the assembled electromagnetic actuator of FIG. 4a.

DETAILED DESCRIPTION

Figure 1:
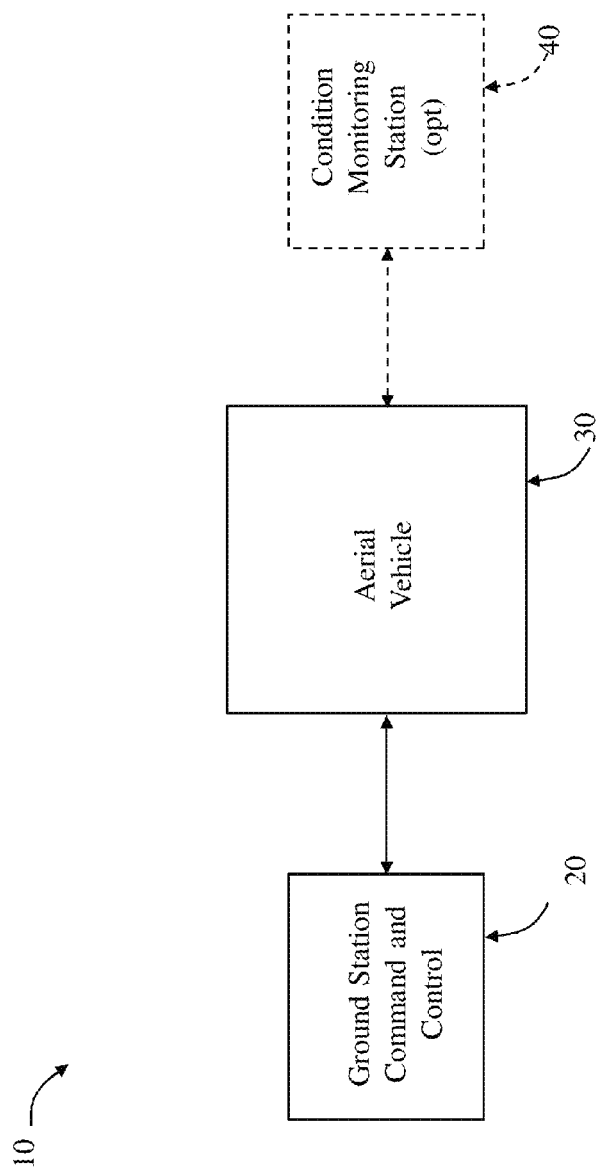
FIG. 1 is a block diagram depicting the interface of an exemplary embodiment of the herein disclosed vehicle system with a ground based communication device(s).

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended by the representations.

A novel electromagnetic actuator designed to operate at system resonance, used in the construction a unique vehicle system, is presented herein. As an exemplary embodiment, the vehicle system presented herein is based on an electromagnetic actuator coupled to a plurality of flapping wings 57 of a micro aerial vehicle. Referring to FIG. 1, a system 10 is depicted. The system 10 includes a ground station for command and control 20, an aerial vehicle 30, and an optional condition monitoring station 40. The ground station 20 is communicatively coupled to the aerial vehicle 30. In one embodiment, the communication is based on a one-way communication (i.e., from the ground station 20 to the aerial vehicle 30). In another embodiment, the communication is based on a two-way communication (i.e., from the ground station 20, the aerial vehicle 30, and from the aerial vehicle 30 to the ground station 20). Similarly, referring still to FIG. 1, an optional condition monitoring station 40 is communicatively coupled to the aerial vehicle 30. In one embodiment, the communication between the optional condition monitoring station 40 and the aerial vehicle 30 is based on a one-way communication (i.e., from the aerial vehicle 30 to the optional condition monitoring station 40), and in another embodiment, the communication is based on a two-way communication (i.e., from the aerial vehicle 30 to the optional condition monitoring station 40 and from the condition monitoring station 40 to the aerial vehicle 30). It should be appreciated that the functionality of the condition monitoring station 40, described further below, may be integrated into the ground station 20 and vice versa.

The ground station 20 is configured to provide simple or encrypted messages to the aerial vehicle 30 in order to control the aerial vehicle 30. As an example, the control may be based on providing a destination coordinate using various coordinate systems (including Cartesian, global positioning system type coordinates, etc.) to the aerial vehicle 30 and a desired time of arrival. In this manner, the aerial vehicle 30 is configured to receive the destination coordinate and time of arrival at the destination coordinate, plotting a course using various subsystems (including global positioning systems, accelerometer and gyroscope-based systems). Alternatively, the control may be based on a point-by-point control of the aerial system 30. Using this approach, a manual control system can be implemented which includes one or a plurality of operators controlling the movement of the aerial vehicles. The aerial vehicle 30, as further described below, may be configured to provide video and other telemetry information back to the operator(s) to enable the operator(s) to control movement of the aerial vehicle 20.

In the case of implementing the condition monitoring station 40, the aerial vehicle 30 is configured to provide data representative of environmental conditions through which the aerial vehicle 30 is flying. The data can include temperature, humidity, toxicity, radiation, and other data representative of the environment. The optional condition monitoring station 40 may also be configured to provide communication to the aerial vehicle 30 to select between various sensor data.

Figure 2:
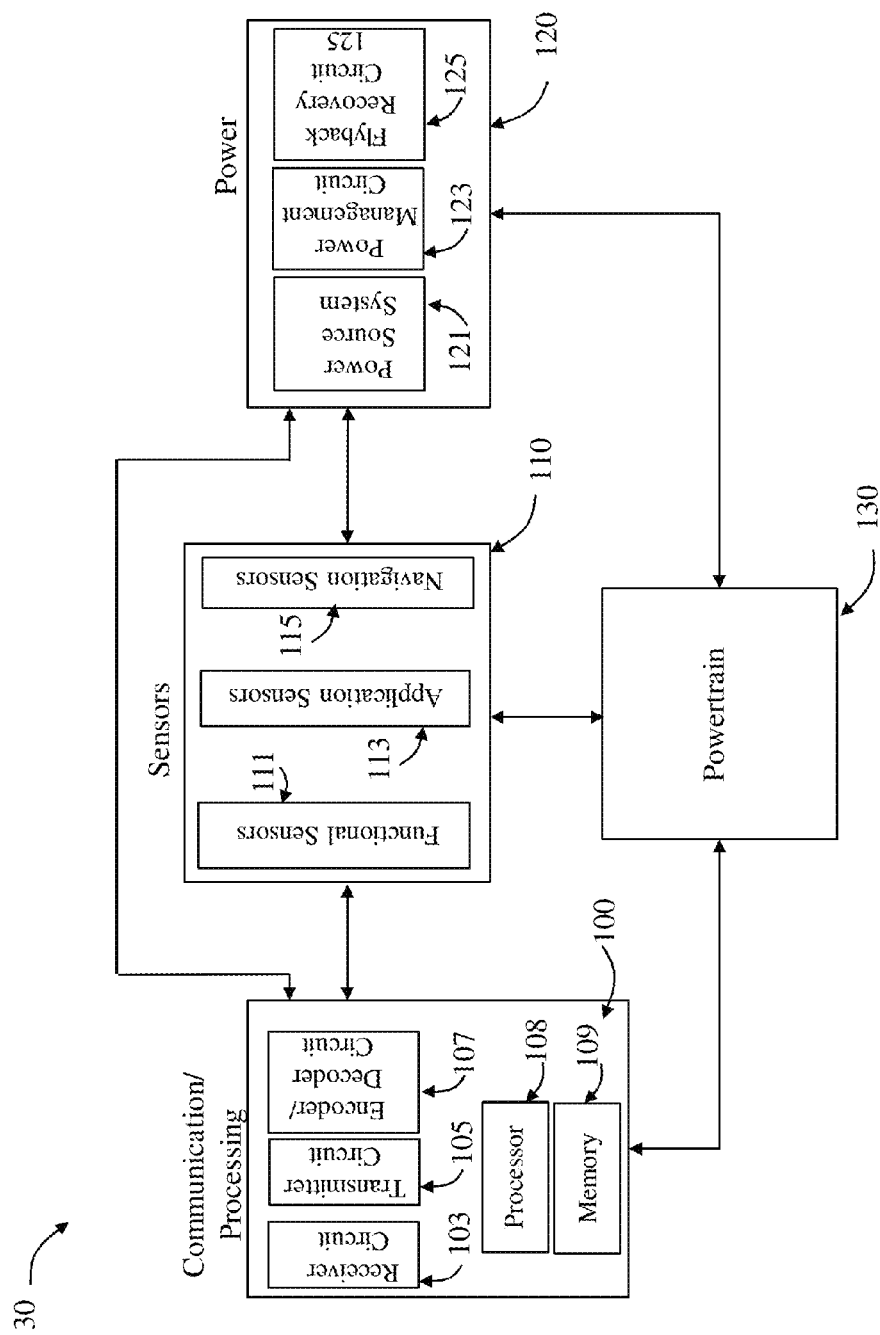
FIG. 2 is a block diagram schematic depicting the exemplary embodiment of the herein disclosed vehicle system subsystems and the individual components that they comprise.

Referring to FIG. 2, in yet another embodiment, a general schematic of select blocks of the aerial vehicle 30 is depicted. It should be appreciated that the blocks shown in FIG. 2 are only exemplary. Other blocks performing various other functionalities may be included in the aerial vehicle 30 that are not shown in FIG. 2. The blocks in FIG. 2 are divided into four groups: a communication/processing block 100, a sensors block 110, a power block 120, and a powertrain block 130. Each block is described separately followed by a description of the interconnections of the blocks.

Referring still to FIG. 2, the communication block 100 includes a receiver circuit 103, a transmitter circuit 105, and an encoder/decoder circuit 107. The receiver circuit 103 and transmitter circuit 105 may be integrated together into a transceiver circuit (not shown), as is known to a person having ordinary skill in the art. The communication block 100 is configured to receive data from another device (e.g., from the ground station 20), or from another block within the aerial vehicle 30. The received data is decoded, if the data is received from another component, or is encoded if the data is received from another block within the aerial vehicle 30. The decoding/encoding may be based on frequency modulation, phase modulation, identification coding appended to data, or other schemes known to a person having ordinary skill in the art. The received-decoded data is then communicated to the appropriate block within the aerial vehicle 30. The encoded data is transmitted to another device (e.g., the ground station 20).

The communication/processing block 100 may also include a processing unit and memory for processing data and holding data in memory. The processor may be a general-type processor or an application specific integrated circuit processor. The memory may include volatile memory and/or non-volatile memory.

Referring still to FIG. 2, the sensor block 110 includes functional sensors 111, application sensors 113, and navigation sensors 115. The functional sensors 111 include sensors that provide information about the aerial vehicle 20 (such as health of the aerial vehicle 20). For example, as will be described below, the aerial vehicle 20 includes flapping wings 57. The functional sensors 111 may include strain gauge-type sensors to measure loads placed on the wings; they may include temperature sensors to measure temperature of internal components of the powertrain (described below), and various other sensors.

Application sensors 113 may include environmental sensors for measuring environmental conditions. These environmental sensors may further include temperature sensor, humidity sensor, $CO_2$ sensor, CO sensor, $O_2$ sensor, toxic gas sensor, radiation sensor, and various other sensors for measuring environmental conditions through which the aerial vehicle 30 is flying.

The navigation sensors 115 include sensors that are configured to provide positional and orientation information. These sensors may include global positioning system type sensors, gyroscopes, accelerometers, video cameras, infrared imagery cameras, radar sensors, sonar sensors, infrared positional sensors, rotational laser beams for laser mapping systems, and other various sensors that can be used to provide information about position and orientation of the aerial vehicle 30, objects surrounding it, and the path it is taking in order to reach a destination.

The power block 120 includes a power source system 121, a power management circuit 123 and a flyback recovery circuit 125. The power source system 121 may be a combination of rechargeable battery cells, e.g., lithium ion cells, as well as nickel metal hydride and nickel cadmium, as well as non-rechargeable cells. The power management circuit 123 is configured to manage charge placement and take up to and from the power source system 121.

The flyback recovery circuit 125 is configured to recover electrical energy from the electromagnetic actuator (not shown) of the powertrain block 130, described further below. An exemplary embodiment of such a circuit is depicted in the U.S. Pat. No. 6,175,484 to Caruthers et al., and is incorporated herein by reference in its entirety into the present disclosure. The powertrain block 130 includes various components, each of which is further described below.

Each of the major blocks (i.e., communication/processing block 100, sensors block 110, power block 120, and the powertrain block 130) is communicatively (either based on one-way communication or two-way communication) coupled to other blocks within the aerial vehicle 30.

Flapping wing flyers found in nature exhibit unparalleled maneuverability and agile flight performance with apparent ease, presently unachievable by conventional air vehicles. Exploiting unconventional aerodynamic mechanisms unique to flapping wings, flapping wing flyers are able to subtly control the direction and magnitude of flight forces, resulting in remarkable system response. Recent investigations on perturbation responses of free-flying insects demonstrates how these unique flyers control transitions between states of stability in hover and maneuverability in rapidly evasive flight, within confined spaces.

To replicate the flapping wing motion observed in nature, especially at small scales, micro air vehicles have utilized only a few forms of actuation successfully: piezoelectric motors and electromagnetic motors. These types of actuation, when coupled with mechanical transmission subsystems, are capable of generating enhanced stroke amplitudes and reciprocating motion required for flapping flight. Piezoelectric actuators, used in the first at-scale bio-inspired robot to achieve take-off, offer high force, fast response, and moderate efficiency levels at high actuation frequencies. However, the high voltage requirements of these actuators necessitate complex power circuitry, limiting the autonomous ability of these robots due to added weight and availability of adequately sized components. Commercial direct current (DC) motors paired with gear transmissions and four-bar linkage systems have also demonstrated the ability to sustain stable hover. These types of transmission generally only offer fixed wing stroke kinematics and the potential for high mechanical friction and wear, resulting in an increased likelihood of premature failure. With these forms of actuation, operating the aerial system near resonance can be used to conserve energy, recovering work invested to drive inertial components, in much same way that elastic elements in flight system of insects function.

To develop a flapping wing 57 mechanism that operates near resonance while minimizing the transmission loss, an electromagnetic actuator is presented herein. Resonance may be achieved using virtual first permanent magnet 63*a* and a second permanent magnet 63*b* pairs, eliminating the mechanical coupling of components.

Figure 3:
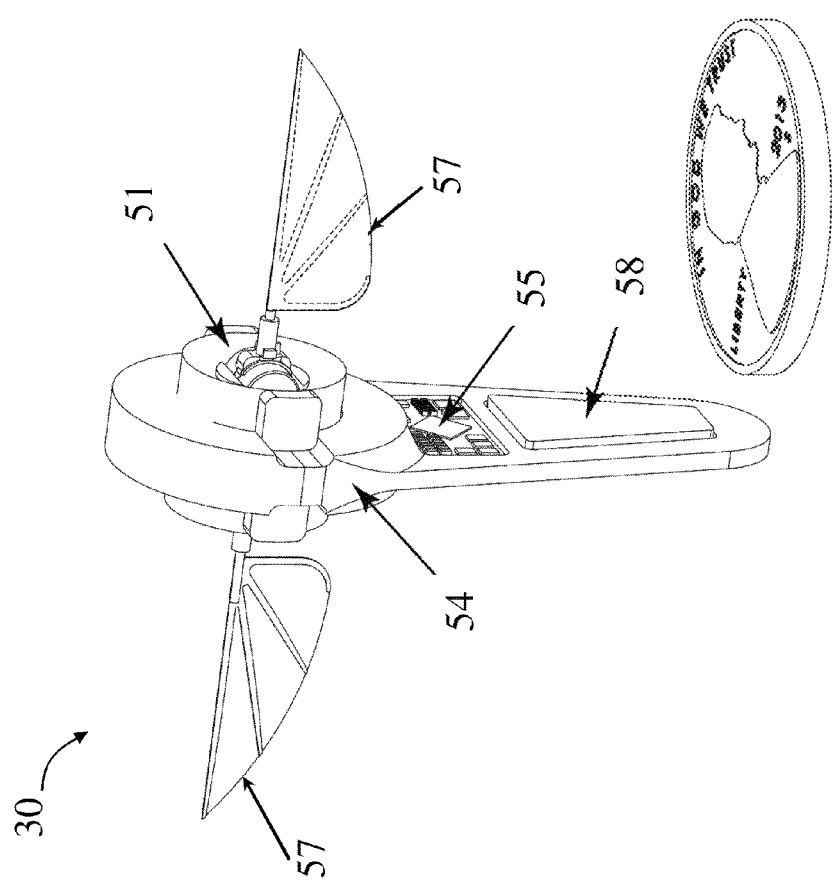
FIG. 3 is a perspective schematic view of an embodiment of the vehicle system.

Referring to FIG. 3, a schematic view of an exemplary embodiment of the aerial vehicle 30 is depicted with two independent electromagnetic actuators 51 connected to a pair of semi-rigid flapping wings 57. A schematic representation of a U.S. penny is provided for a size reference of the aerial vehicle 30. The aerial vehicle 30 depicted in FIG. 3 is based on design and construction of a 2.6 gram electromagnetic actuator 51 operated at resonance. Further, the design depicted in FIG. 3 is based on a wedge-shaped electromagnetic coil (not shown) generating a driving torque on a rotor (not shown) embedded with at least one permanent magnet (not shown). Referring to FIG. 3, a vehicle frame 54 is coupled to at least one flapping wing 57. In FIG. 3, two flapping wings 57 are shown. A communication/processing chip 55 is attached to the vehicle frame 54, along with a battery 58 (or similar power source system 121). Additional permanent magnets (not shown) located on the exterior of the stator (not shown) are used to generate a virtual spring effect, supply a restoring torque to a rotor (not shown) and generating nonlinear system stiffness. It should be noted that although in FIG. 3, the additional permanent magnets (not shown) are herein located on the exterior of the stator (not shown), the permanent magnets may be located internally as well as external to the stator (not shown).

Figure 4A:
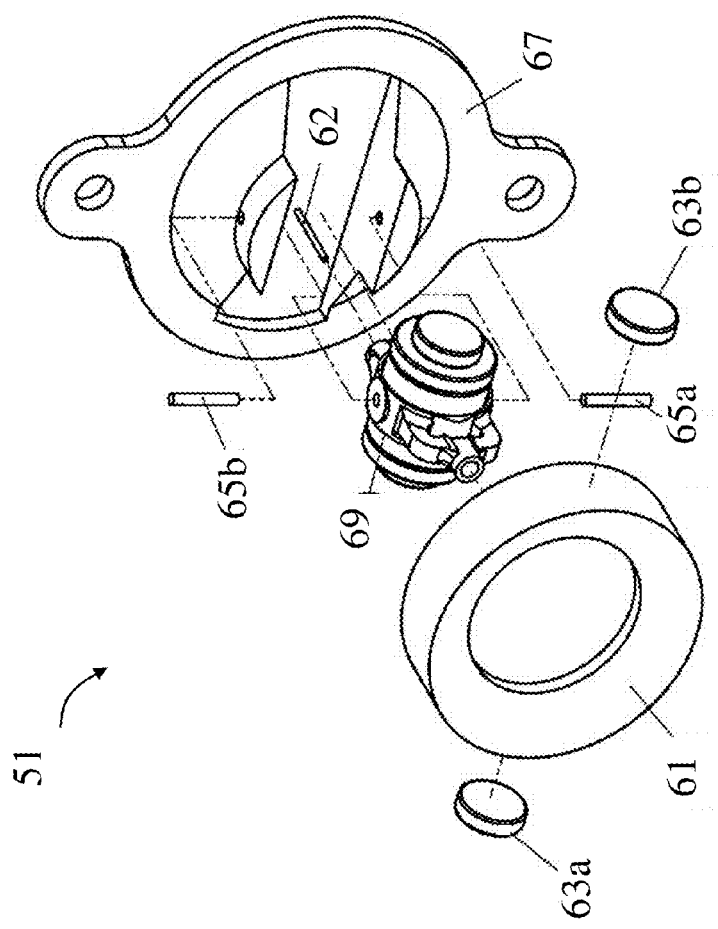
FIG. 4a a schematic representation of an exemplary embodiment of the electromagnetic actuator.
Figure 4B:
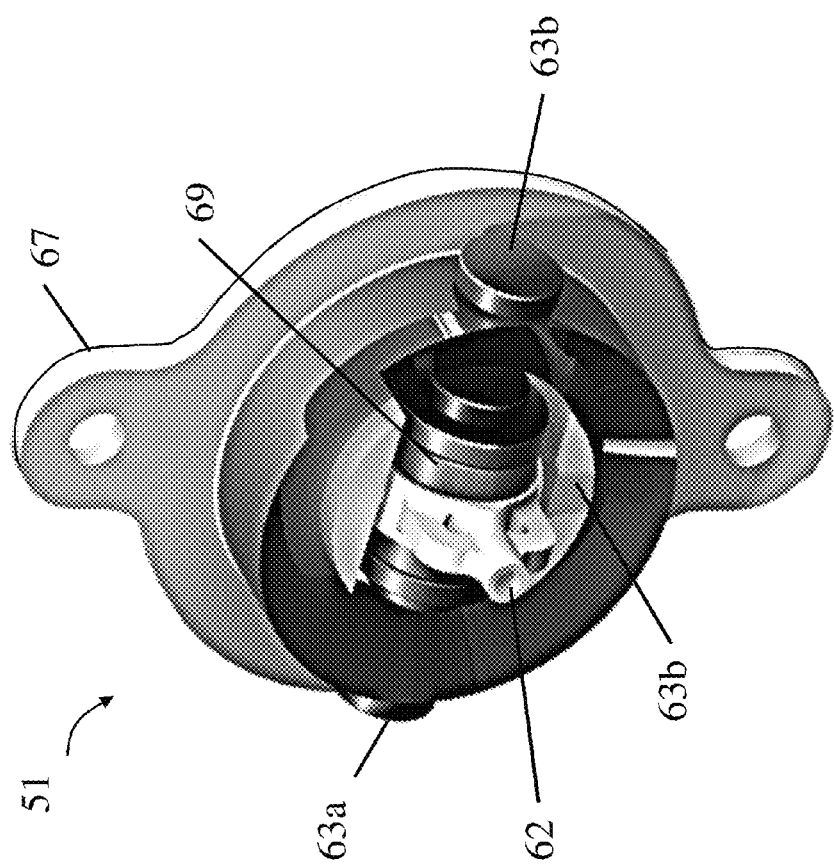

Referring to FIG. 4a, a schematic representation of an exemplary embodiment of the electromagnetic actuator 51 is depicted. An illustration of an assembled electromagnetic actuator 51 of FIG. 4a is shown in FIG. 4b. Referring to FIG. 4a, the electromagnetic actuator 51 is composed of a stator 61 and a rotor 69 embedded with at least one permanent disc magnet (not shown) positioned within the magnetic coil stator. In the current embodiment, a series of permanent magnets reside in recesses on opposing sides of the rotor 69 and are secured in location by their attraction force, with polarity alignment. The rotor 69 is retained to the interior of the actuator frame 67 with a first metal pin 65a and a second metal pivot pin 65b, and the stator 61 is coupled to the actuator frame 67, configured to be coupled with a negative of its profile. The first permanent magnet 63a and the second permanent magnet 63b are located on the exterior perimeter of the stator 61 in a polarity alignment with embedded magnets in the rotor 69, providing a restoring torque on the rotor when displaced from an equilibrium position. It should be appreciated that although the stator 61 described herein is an electromagnetic coil stator, such use is not to be considered limiting. Accordingly, as described herein, a stator 61 may be a magnetic stator as well.

Materials composing the electromagnetic actuator 51 may comprise of high temperature coated copper, aluminum, or a combination of copper clad aluminum wire of varying magnetic wire of gauges. In addition, the first permanent magnet 63a and the second permanent magnet 63b are to be considered as describing only the exemplary embodiment presented herein. Accordingly, such permanent magnet pairs may be replaced with torsional or elastic-based components to create variable system stiffness and thereby alter system resonance properties. Similarly, the rotor 69 comprises alternative forms of commercially available magnetic rotor solids which may be chosen according to a particular use to enhance performance and efficiency. Moreover, alterations to the magnetic field generation and interactions through the use of shielding materials applied to the stator 61 and actuator frame 67 may be made. These alterations may include use of paramagnetic materials (including ferrous compounds and nickels) and diamagnetic materials (including ceramics and organic- or carbon-based materials).

Figure 4C:
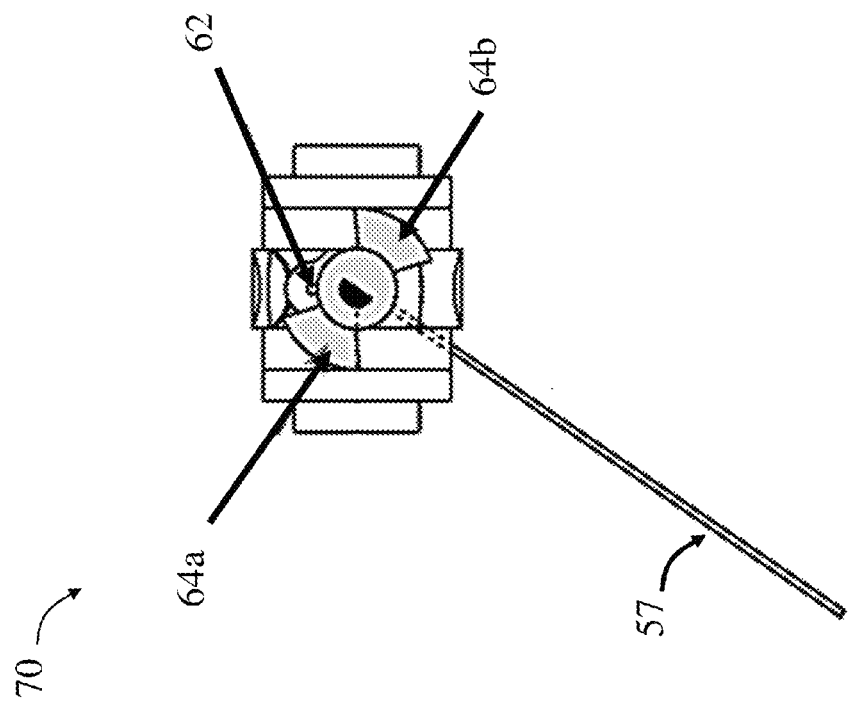
FIG. 4c is an illustration of a rear view schematic illustration of a stopper mechanism depicting the passive mechanism by which the rotation angle of the wing is limited.

According to the design depicted in FIG. 4a, a stopper device 62 (in this embodiment, a stopper pin) allows connection between the aerial vehicle 30 and a flapping wing 57. Referring to FIG. 4c, which is a rear view schematic illustration of a stopper mechanism 70, a stopper device 62 is coupled to a first stopper profile 64a and a second stopper profile 64b. Referring still to FIG. 4c, the stopper device 62 is coupled to a flapping wing 57. It should be appreciated that the exact configuration and design of the stopper mechanism 70 depicted in FIG. 4c is dependent on the number of flapping wings 57 and the number of stoppers may be varied accordingly.

Figure 4D:
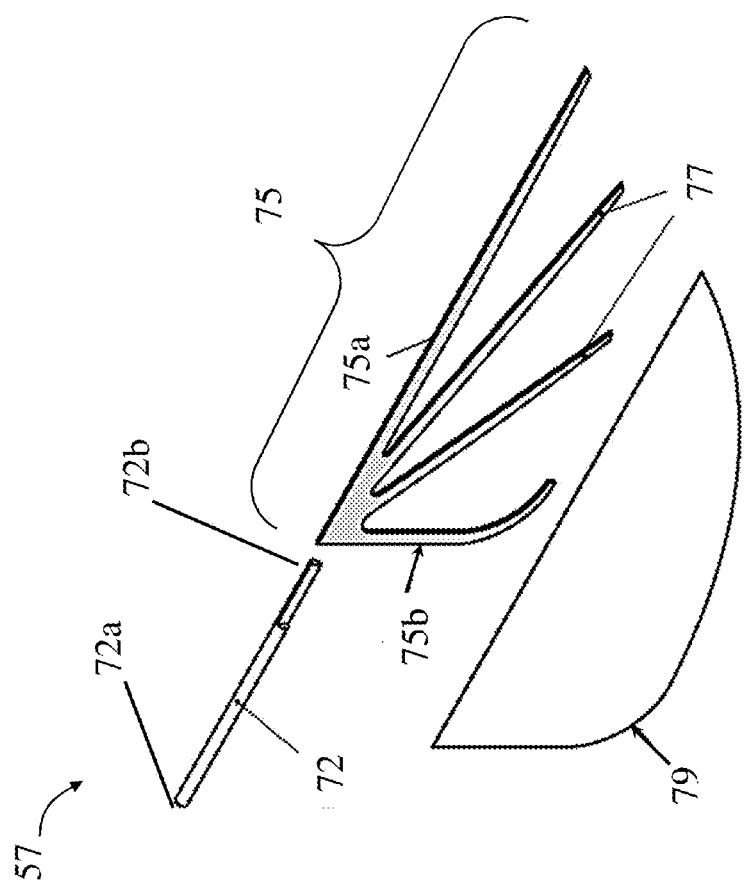
FIG. 4d is a schematic of the components of an exemplary embodiment of an actuating member.

It should be noted that although in FIG. 4a, the stator 61 takes the form of a wedge-like shape, such a characterization is not intended to be limiting. Rather, the stator 61 can take any shape to be appropriately configured with the remaining components, including rectangular, trapezoidal shaped-coil cross-sectional profiles, forming torus, hemispherical, or conical solids of revolution. The components of an embodiment of a flapping wing 57 are depicted in FIG. 4d. Referring to FIG. 4d, an exemplary flapping wing 57 is comprised of a wing spar 75 having a top end 75a and a bottom end 75b as the main structural member of the flapping wing 57, where the wing spar 75 is composed of a plurality of wing veins 77. The wing spar is coupled to a wing rod 72, which is comprised of a proximal end 72a coupled to the stopper mechanism 70, and a distal end 72b coupled to the wing spar 75. A wing membrane 79 is attached to the wing spar 75.

Figure 5A:
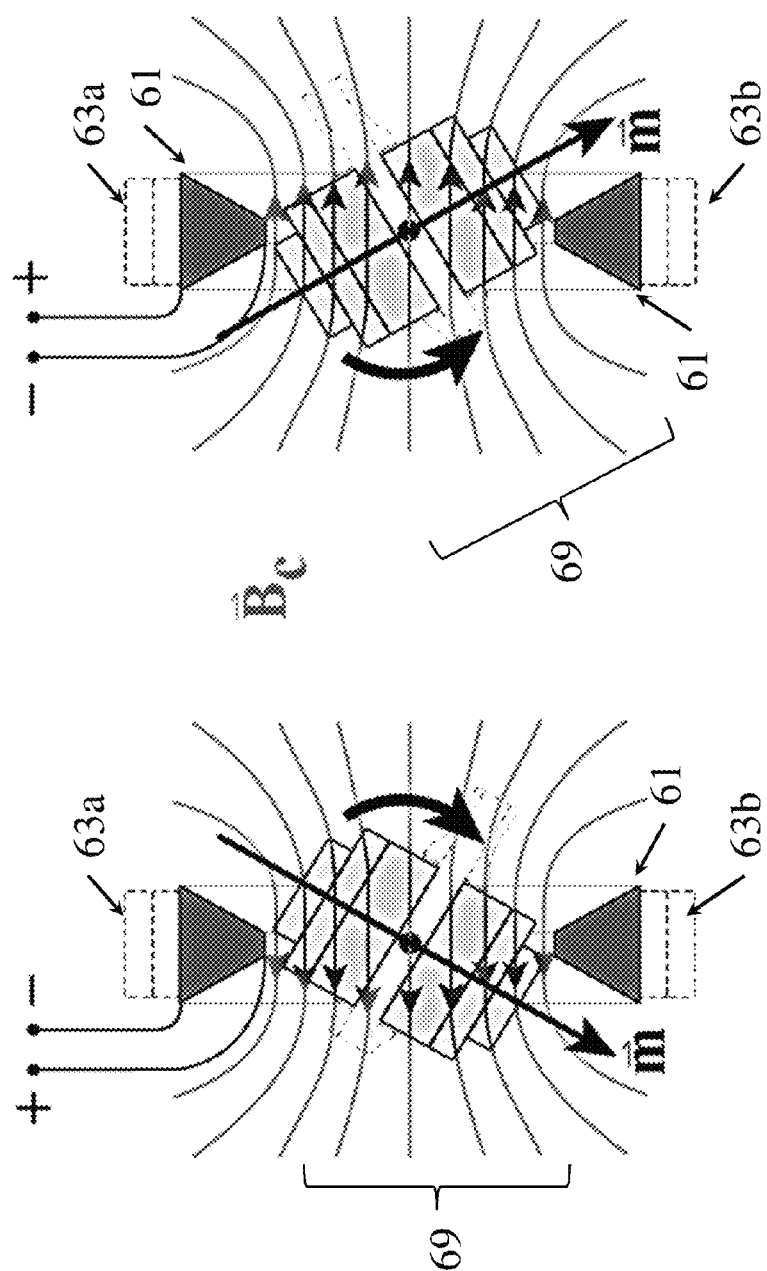
FIG. 5a is an illustration of the torque imparted on the magnetic rotor due to the interaction between the magnetic flux density field produced by the stator and the dipole moment of the magnetic rotor.
Figure 5B:
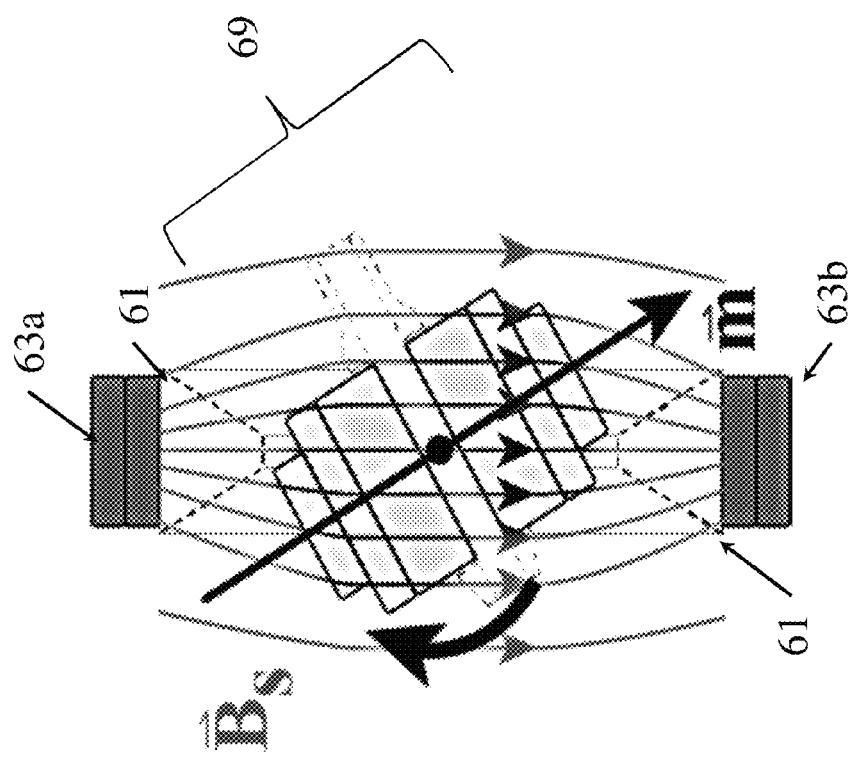
FIG. 5b is an illustration of the torque imparted on the magnetic rotor due to the interaction between the dipole moments of the external permanent magnet pair and the magnetic rotor

Referring to FIG. 5a, which depicts the electromagnetic actuator 51 cross sections and magnetic fields produced by the stator 61 and a first permanent magnet 63a and second permanent magnet 63b and the resulting torques acting on the rotor 69. Applying a potential difference across the leads of the stator 61 generates a magnetic field around each winding, which when summed determines the net field surrounding the stator 61. This field generates a driving torque acting upon the rotor 69 due to the interaction between the resultant dipole moment of the permanent magnets embedded in the rotor 69 and the flux density B-field produced by the stator 61, as depicted in FIG. 5a. Referring to FIG. 5b, which depicts the electromagnetic actuator 51 cross section and the magnetic field produced by the first permanent magnet 63a and second permanent magnet 63b attached to the perimeter of the stator 61 with the same polarity alignment as the embedded magnets (not shown) on the rotor 69. A spring effect is achieved through interaction between the first permanent magnet disc 63a and second permanent magnet disc 63b dipole moments and the resultant dipole moment of the permanent magnets (not shown) embedded in the rotor 69. These "virtual" springs generate a restoring torque on the rotor 69 when it is displaced from an equilibrium position without mechanical coupling. The strength of this torque, or the effective stiffness of the system, can be varied by changing the size, quantity, and relative location of these permanent disc magnets (not shown). Harmonic oscillation of the rotor 69 results from an alternating potential difference applied across the magnetic coil stator 61 and a restoring torque produced from the first permanent magnet 63a and second permanent magnet 63b. In an exemplary embodiment, the frequency of the external voltage signal is chosen to match the primary mode of resonance of the system as described below.

In addition to an electromagnetic actuator 51, yet another embodiment of the present invention includes an electromagnetic generator, which comprises a generator frame, a rotor disposed within the generator frame and configured to have direct rotational oscillation about a rotation axis following a predetermined rotational arc having a middle position and operatively within a predetermined oscillation frequency range, a stator disposed within the generator frame positioned proximate to the rotor and configured to remain stationary, combination of the stator and the rotor configured to receive electrical energy generated by the rotor, at least one restoring element configured to provide a net counter torque to the rotor to bias the rotor to rotate to the middle position, where the net counter torque is at its minimum when the rotor's rotational position corresponds to the middle position, at least one set of excitation terminals configured to receive electrical energy received by the stator; and at least one generator coupling having a proximal end and a distal end, the distal end configured to couple to at least one generator member and the proximal end configured to couple to the rotor, motion of the at least one generator member causing motion of the rotor thereby generating electricity on the stator.

While a virtual spring effect through the use of magnetic interaction is described herein, it should be appreciated that alternative implementations with the same spring effect can be provided, including but not limited to an actual torsional spring member. In addition, various changes in the electromagnetic actuator's 51 configuration and components parameters, including but not limited to coil cross-sectional and platform shapes, use of alternative actuator component materials, actuating member arrangements, and the number of degrees of articulation, can be made to the actuator for optimization purposes based on the specific type of application. In addition, as used herein, "flapping wing" is to be considered equivalent to, and merely one embodiment of, an actuating member. An actuating member comprises any locomotive element, including wings, fins, and legs. Additional enhancements to the efficiency of the electromagnetic actuator 51 through the use of wrappings and coatings are also considered as parameter based optimizations of the actuator. Modifications to the configuration and number of actuators for the application of alternative forms of locomotive motion other than the specific aerial vehicle presented are also within the scope of this disclosure.

EXAMPLE

As an example of the herein described aerial vehicle system, flapping wing 57 parameters were varied systematically to generate 16 unique wing profiles, from which a set of test wings were fabricated. Based on the equations of motion, estimates for the primary mode of resonance and the peak-to-peak stroke amplitude were determined using an approximate solution. Frequency response tests were conducted on the flapper using the set of test wings at varying supply voltages and spring configurations to verify predicted resonate frequencies and amplitudes. Wing kinematics and mean lift measurements were made for the flapper operating at resonance, producing a lift-to-weight ratio of over one at 24V. The stator 61 was fabricated in a two-part coil mold using a "wet" wrapping technique in which an epoxy binder was applied to the wire as it was formed around the profile mold.

The distribution of mass and area along the flapping wing 57 affect aerodynamic characteristics warranting careful consideration in accessing actuator performance. Describing the flapping wing's 57 platform area by wing length R and chord length c, dimensionless $1^{st}$, $2^{nd}$, and $3^{rd}$ moments of area $\hat{r}_1(S)$, $\hat{r}_2^2(S)$, and $\hat{r}_3^3(S)$, moment of inertia $I_w$, and dimensionless first moment of mass $\hat{r}_1$ (S) are defined for the wing.

As an exemplary embodiment of the above described devices, flapping wing 57 shapes may be generated based on three parameters: $\hat{r}_2^2(S)$, wing length, and aspect ratio.

Spanning the range of values reported in biological studies on flapping flight, three values for $\hat{r}_2$ (S) are chosen; 0.50, 0.55, and 0.60. Non-dimensional wing profiles are then generated by a statistical Beta distribution, using the power function as indicated in Equation (1), $$\hat{r}_1(S) = 1.106[\hat{r}_2(S)]^{1.366}. \tag{1}$$

Wing profiles are scaled using a selected range of wing lengths and aspect ratios.

In this example, wings were constructed from unidirectional carbon fiber thread and 3 μm thick Mylar (BoPET) sheets to ensure proper wing rigidity while maintaining minimal weight. The wing frame, composed of veins and leading and trailing edge spars (FIG. 4*d*) was formed using carbon fiber segments impregnated with epoxy binder. Mylar was directly attached to the finished wing frame using a polyurethane adhesive, forming the wing's membrane. To complete the wing, half round carbon fiber rod was attached to the top portion of the wing spar 75*a* with cyanoacrylate adhesive.

Actual flapping wing 57 parameters were measured experimentally post fabrication. Using digital images of the completed flapping wings 57, the actual flapping wing 57 length, aspect ratio, $\hat{r}_1^1(S)$, $\hat{r}_2^2(S)$, and $\hat{r}_3^3(S)$ values were obtained using an open source software package. Approximating the flapping wing 57 as a compound pendulum, flapping wings 57 were suspended, perturbed by an initial displacement, and allowed it to oscillate under the influence of gravity. The moment of inertia of the wing based on the period of oscillation is given by Equation (2), $$I_w = \frac{rmgT^2}{4\pi^2} \tag{2}$$

where r, m, g, and T, is the distance from the pivot axis to the center of mass, the wing mass, the gravitational constant, and the period of the oscillation, respectively. The location of the flapping wing's 57 center of mass was found from the bisection of two reference lines through the center of mass obtained from two suspended flapping wing 57 images.

To mount the wing within the actuator, the wing rod was retained within the rotor 69 using a press fit stopper, permitting only a single degree of rotational freedom, along the longitudinal axis $\hat{e}_x$. Passive rotation of the wing is limited through contact between the stopper and a fixed pin in the rotor at the minimum angle of attack (denoted as α in FIG. 4*c*).)

Stoppers of varying angular limitations ranging from 40° to 60° were printed using the rapid-prototyping process. The complete actuator with wing included weighed approximately 2.60 grams.

In the following description, analytical models for the actuator dynamics are presented. Torques acting on the permanent magnets embedded in the rotor 69 due to the stator 61, the first permanent magnet 63*a* and the second permanent magnet 63*b*, and estimated aerodynamic drag on the flapping wing 57 are used to form the actuator's equation of motion, simplified to a single degree of freedom (DOF).

Figure 6B:
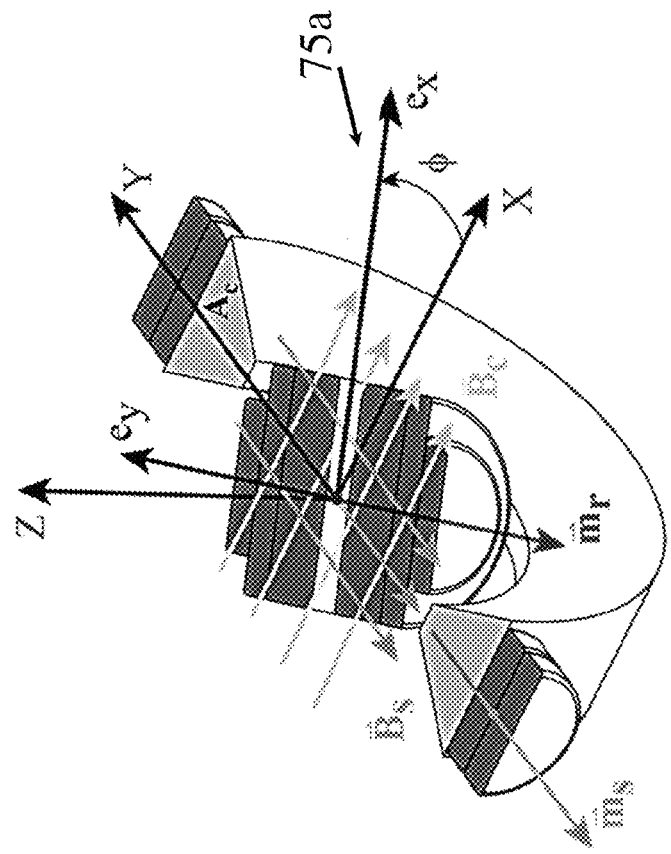
FIG. 6b is an illustration depicting magnetic flux density vector fields from the coil and magnetic pairs exterior of the coil acting on the magnetic dipole of the rotor.
Figure 6A:
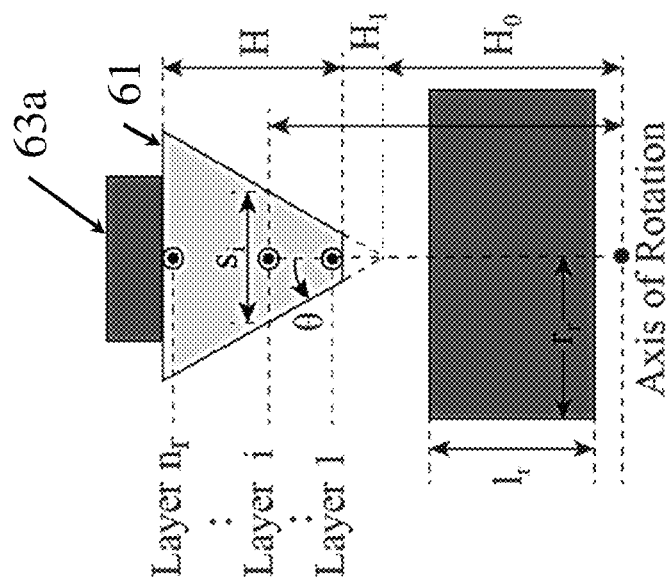
FIG. 6a is an illustration depicting the electromagnetic coil discretization layers $n_r$, with the $i^{th}$ layer having a width $s_i$, and comprising $N_i$, windings at a radial distance $r_i$, from the center of the coil; dimensional components are used in the formulation of mathematical models form which further analysis was conducted, resulting in the development of a working prototype.

Referring to FIG. 6*a*, the unique geometry of the magnetic coil stator 61 profile makes derivation for the stator's 61 magnetic field by standard integration impractical. Therefore the cross-sectional area of the magnetic coil stator 61 was discretized into a series of stacked coil layers, as depicted in FIG. 6*a*. The total number of coil layers $n_r$, with the $i^{th}$ layer having a width $s_i$, and comprising $N_i$ windings at a radial distance $r_i$ from the center of the coil, are defined. Radial dimensions of the magnetic coil stator 61 are defined successively starting from the magnetic coil stator 61 center as, $H_0$ to profile vertex, $H_1$ to the profile cutout, and H to the outer diameter. The wedge angle θ is defined with respect to the profile's axis of symmetry. Therefore, referring to Equations (3) and (4), it is shown that, $$n_r = \left\lfloor \frac{H}{D_w} \right\rfloor, \quad (3)$$

and $$N_i = \left\lfloor \frac{2\left[D_w\left(i - \frac{1}{2}\right) + H_1\right]\tan\theta}{D_w} \right\rfloor, \quad (4)$$

where $D_w$ is the wire diameter.

From Biot-Savart law, a model of the magnetic flux density field (or B-field) generated by the coil can be developed. Assuming that the magnetic flux density field is uniform and acting along the axial direction $\hat{X}$ (FIG. 6b), a single evaluation point at the center of coil was used to find the B-field contribution of each $i^{th}$ coil layer:

$$B_{ci} = N_i \left(\frac{\mu_0 I}{4\pi}\right) \int_0^{2\pi} \left(\frac{r_i}{r_i^2}\right) d\varphi \hat{X} = \left(\frac{\mu_0 I}{2}\right)\left(\frac{N_i}{r_i}\right)\hat{X}, \quad (5)$$

where $\mu_0$, I, φ, is the permeability of free space, the applied current, and the angle around the circumference of the coil, respectively. Summing the contributions of all coil layers yields, $$B_c = \left(\frac{\mu_0 I}{2}\right)\sum_{i=1}^{n_r}\left(\frac{N_i}{r_i}\right)\hat{X}. \quad (6)$$

The current is given by $I=(U-U_{ind})/R_c$ where U, $U_{ind}$, and $R_c$ is the supplied voltage, the induced voltage produced by the moving rotor magnets, and the resistance of the coil wire. Approximating the rotor magnets as a single dipole moment $m_r$, the torque applied to the rotor by the coil's magnetic field $B_c$ is given by, $$\tau_c = m_r \times B_c = \tau_m \cos(\phi)\hat{Z} \quad (7)$$

and, $$\tau_m = \left(\pi r_r^2 l_r B_r \sum_{i=1}^{n_r} \frac{n_i}{r_i}\right) I = K_T I, \quad (8)$$

where $B_r$, $r_{m_j}$, $t_j$, and $K_\tau$ is, respectively, the residual flux density, the radius and thickness of the permanent magnets and the coil torque constant.

Approximating the first permanent magnet 63a and a second permanent magnet 63b as a single magnetic dipole $m_s$, the torque acting on the rotor through the interaction of $m_s$ and $m_r$ is given by, $$\tau_s = \frac{\mu_0 m_s m_r}{4\pi\left(H_0 + H_1 + H + \frac{1}{2}l_s\right)^3}[3(\hat{m}_s \cdot \hat{Y})(\hat{m}_r \times \hat{Y}) + (\hat{m}_s \times \hat{m}_r)] \quad (9)$$

$$= -k_1 \sin\phi \hat{Z}$$

where, $$k_1 = \frac{2\pi}{\mu_0\left(H_0 + H_1 + H + \frac{1}{2}l_s\right)^3}(B_r)^2(r_s^2 l_s r_r^2 l_r) \quad (10)$$

is the effective spring constant and $l_s$ and $r_s$ are the width and radius of the first permanent magnet 63a and a second permanent magnet 63b.

Considering the friction at the pivot to be negligible, damping is dominated by aerodynamic drag. Despite the complex fluid interactions affecting flapping wings 57, primary force components are adequately captured by the quasi-steady model. The aerodynamic torque acting on the flapping wing 57 can, therefore, be modeled as a quadratic function of the flapping velocity, $$\tau_d = -\tfrac{1}{2}\rho_a \overline{C}_D R_w^4 \hat{cr}_3^3(S)\dot{\phi}|\dot{\phi}| = c_2\dot{\phi}|\dot{\phi}|, \quad (11)$$

where $\rho_a$, $R_w$, and $\overline{C}_D$ is, respectively, the air density, the wing length and the cycle average mean coefficient of drag, estimated by, $$\overline{C}_D(\alpha_m) = \overline{1.92 - 1.55\cos(2.04\alpha - 9.82)}. \quad (12)$$

where α is the instantaneous flapping wing 57 rotation angle varying passively during the flapping wing 57 stroke. Assuming α is a sinusoidal function with amplitude $\alpha_m$, and a minimum rotation angle limited by the stopper, $\overline{C}_D$ can be calculated numerically.

Combining the effects of the driving and restoring torque produced by the coil and first permanent magnet 63a and a second permanent magnet 63b, respectively, and the aerodynamic drag on the wing, the equation of motion for the single degree of freedom approximation of the system is given by, $$(I_r + I_w)\ddot{\phi} + c_2\dot{\phi}|\dot{\phi}| + k_1\phi = \tau_m\cos(\phi), \quad (13)$$

where $I_r$ and $I_w$ is, respectively, the moment of inertia of the rotor and wing. $I_r$ was determined from the CAD model, given the geometry and density of the components. Estimates of the driving and restoring torque, $\tau_c$ and $\tau_s$, based on the presented models were measured in independent experiments and compared to validate and improve the model, which was then applied to the optimize the actuator.

To evaluate the performance of the actuator, experimental bench tests were conducted to independently measure the torques generated by the stator 61 and first permanent magnet 63a and a second permanent magnet 63b on the actuator rotor. A comparison was then made between these sets of measurements and the theoretical values derived from models. Data was curve fit using a least squares regression and applied to the equation of motion, from which an approximate solution was obtained.

The electromagnetic actuator 51, fixed within an adapter, was mounted on six-component force/torque transducer in the center of an arched test fixture equipped with an adjustable track and slide system designed to retain the rotor at any angle with respect to the sensor. An integrated protractor with 5° raised hashes indicates the rotor's angular position, allowing the slide to be easily positioned in the track at any angle within a 150° range. A metal rod inserted through the rotor and fixture slide couples the two systems. Components were anchored to a vibration isolated table to mitigate environmental influences. Test fixture components were manufactured using the photopolymer printing process discussed previously.

Figure 7B:
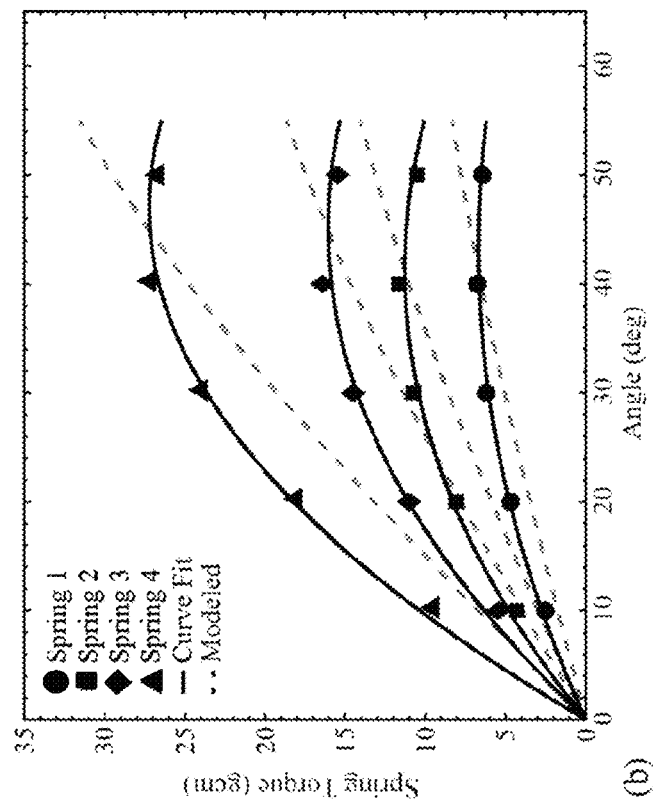
FIG. 7b is a graphical depiction of static torque measurements imparted on the magnetic rotor through interaction with the external permanent magnet pairs.
Figure 7A:
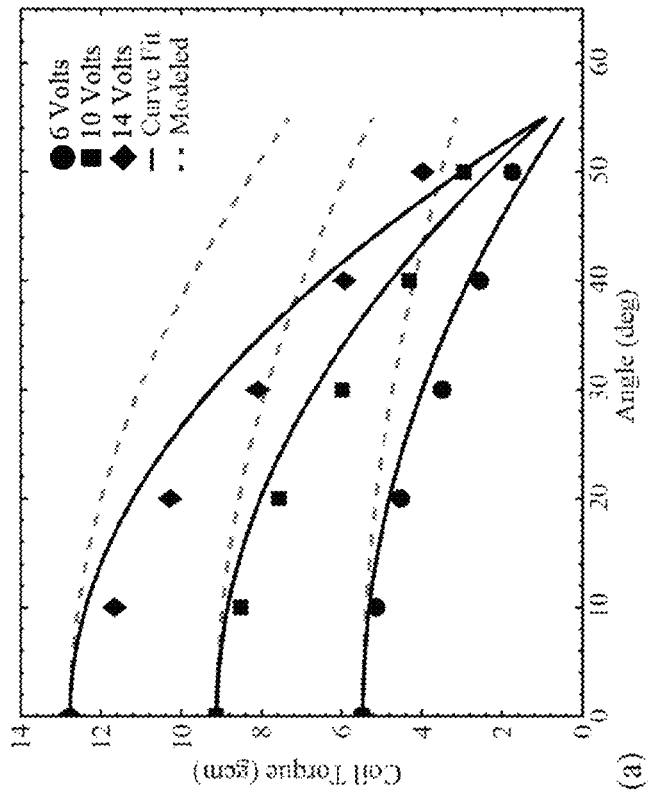
FIG. 7a is a graphical depiction of static torque measurements imparted on the magnetic rotor through interaction with the stator.

Static torque experiments for the coil were conducted using three voltages applied across the coil; 6, 10, and 14V. To cover the rotor's 120° operating range, 11 angular positions were chosen at increments of 10° from absolute zero for a combined total of 36 data sets. Data recording sessions were limited in duration and the current draw monitored due to coil's resistance dependency on temperature. FIG. 7(a) shows the measured and theoretical torques generated by the stator 61 for three voltages. The model is shown to accurately predict torque values within 4% error at low stroke angles; however with increased stroke angle these curves diverge with the model overestimating values. This deviation is thought to stem from the assumed uniformity of the coil's magnetic field and the simplified dipole model. Dividing through by $\tau_m$, measured data was fit using the relationship, $$\tau_c = \tau_m(1+a_m\phi^2)\hat{Z}, \quad (14)$$

where $a_m$ is a constant determined by regression.

Four configurations of the first permanent magnet 63a and a second permanent magnet 63b, utilizing 3.175 mm and 4.7625 mm diameter N52 neodymium discs in single and double pair arrangements, were chosen for testing to provide a large range of effective stiffness. FIG. 7(b) shows the measured and theoretical restoring torques produced by the first permanent magnet 63a and a second permanent magnet 63b. A notable deviation in trend throughout the angular range of the rotor 69 results in an average percentage error of 20%, with the analytical model under predicting values. This error can be attributed to the inaccuracy in dipole model used to approximate the magnet pairs. Therefore, the derived model was modified by a polynomial fit of a soft quadratic spring model, $$\tau_s = k_1\psi + k_2|\psi|\psi|\hat{Z}, \quad (15)$$

where $k_1$ and $k_2$ are linear and quadratic spring coefficients determined by regression Incorporating expressions for actual torque generated by the coil and the first permanent magnet 63a and a second permanent magnet 63b into the equation of motion and considering the alternating voltage applied across the coil to be a square waveform symmetric about zero yields, $$I_{tot}\ddot{\phi}+c_1\dot{\phi}|\dot{\phi}|+k_1\phi+k_2\phi|\phi|=\tau_m(1+a_m\psi^2)\text{sgn}[\sin(\omega t)]\hat{Z}, \quad (16)$$

where $I_{tot}=I_r+I_w$, sgn( ) is the sign function, and $\omega$ is the frequency of the square wave. This expression includes a quadratic spring nonlinearity ($k_2\phi|\phi|$), a quadratic damping term ($c_2\phi|\phi|$), due to aerodynamic drag, and a nonlinear forcing function ($\tau_m(1+a_m\phi^2)\text{sgn}(\sin \omega t)$). The primary resonance frequency of the system is, $$\omega_0 = \sqrt{\frac{k_1}{I_{tot}}}. \quad (17)$$

Using the method of multiple time scales and considering the steady-state solution for the stroke amplitude, the peak-to-peak amplitude is given by, $$\Phi_m = \sqrt{\frac{3\pi\tau_m I_{tot}}{2c_1 k_1 - \frac{3a_m}{16}\pi\tau_m I_{tot}}}. \quad (18)$$

Note that this approximate solution form is independent of the nonlinear quadratic stiffness term. With $\tau_m$ and $k_1$ determined experimentally in the previous section and applying the fabricated wing characteristics from Table I, the theoretical flapping frequency and amplitude for each wing can be determined.

Validation of the dynamic model presented is of particular importance because predictions of flapping frequency and amplitude can be ascertained and used to estimate the aerodynamic performance of the actuator. The actual flapping frequency and amplitude was measured for the 16 fabricated wings using frequency response tests. Aerodynamic lift was also measured in different testing conditions and the actuator performance was evaluated.

Using previous static torque experiments as a basis, much of the equipment from the bench test was adapted for frequency response experiments. The actuator, with fabricated wing attached, was mounted on the same six-component force/torque transducer. A printed protractor displaying 5° minor and 10° major reference lines across a 140° range (±70° amplitude) was placed under the sensor mount, centered on the actuator's axis of rotation. This protractor served as reference during the frequency tuning process, providing estimates of the steady-state stroke amplitude. A high speed camera positioned above the test fixture and perpendicular to the table, was used to capture 1280×512 8-bit monochrome images at 1000 fps. Wing stroke and rotation angles were extracted from high speed images using an open source software, with estimates of the wing rotation based on projections of a perpendicular wing chord, marked by a straight lines along the flapping wing 57.

Coil drive circuitry was constructed using a L293 quadruple half H-bridge IC (Texas Instruments Incorp.) supplied with a regulated drive voltage using a selectable DC power supply with a 0 to 24V output range. Alternating logic signals sent by a microcontroller were applied to the inputs of the IC, switching the polarity of the current through the coil at the desired frequency. This frequency was externally tuned using a potentiometer, sending an analog voltage signal to the microcontroller calibrated from 0 to 80 Hz. Frequency readouts from the microcontroller were used as feedback while tuning with the potentiometer.

Figures 8A, 8B, 8C, 8D:
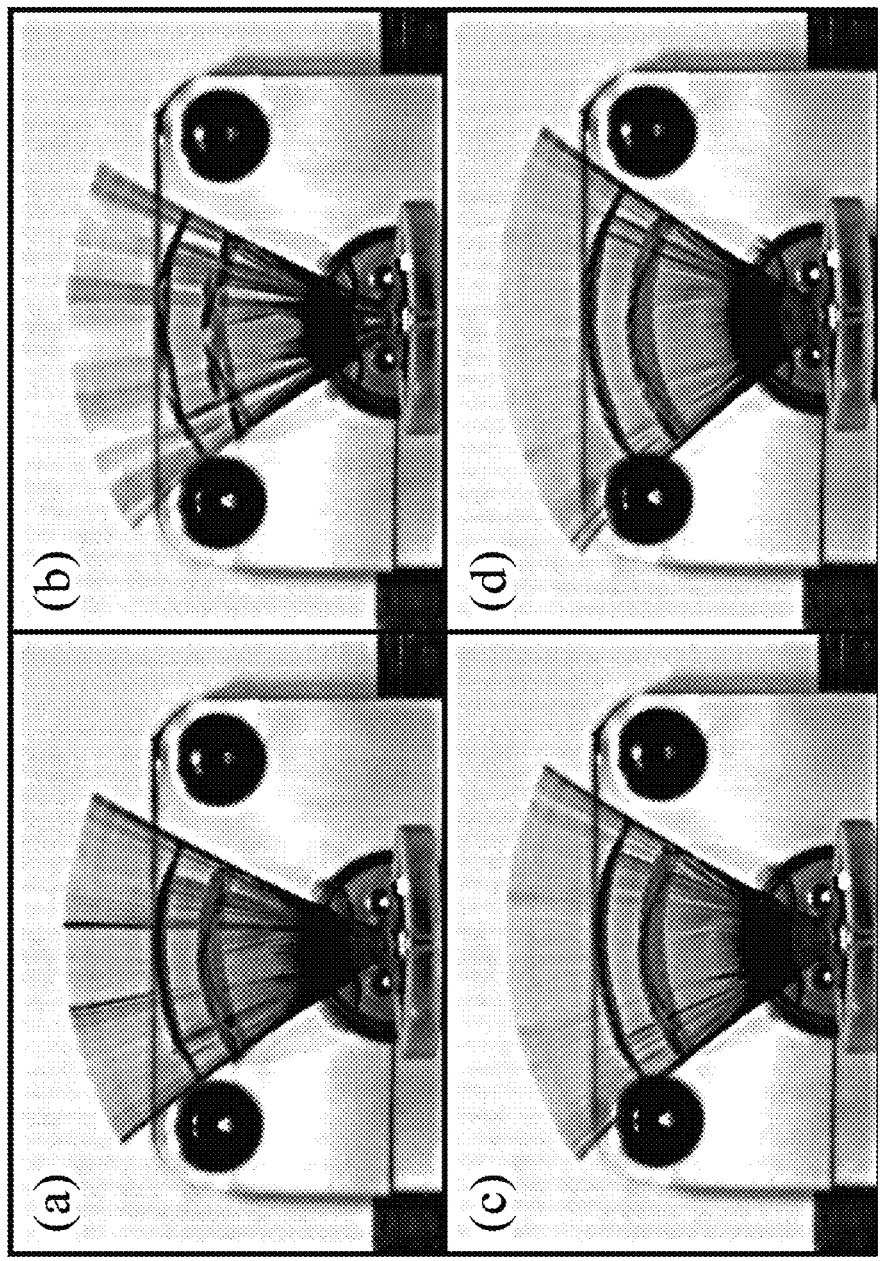
FIGS. 8a-8h are composite images of the flapping wings stroke amplitude at increasing drive frequencies that were taken from photographs during frequency response experiments conducted on the actuator and wing system.
Figures 8E, 8F, 8G, 8H:
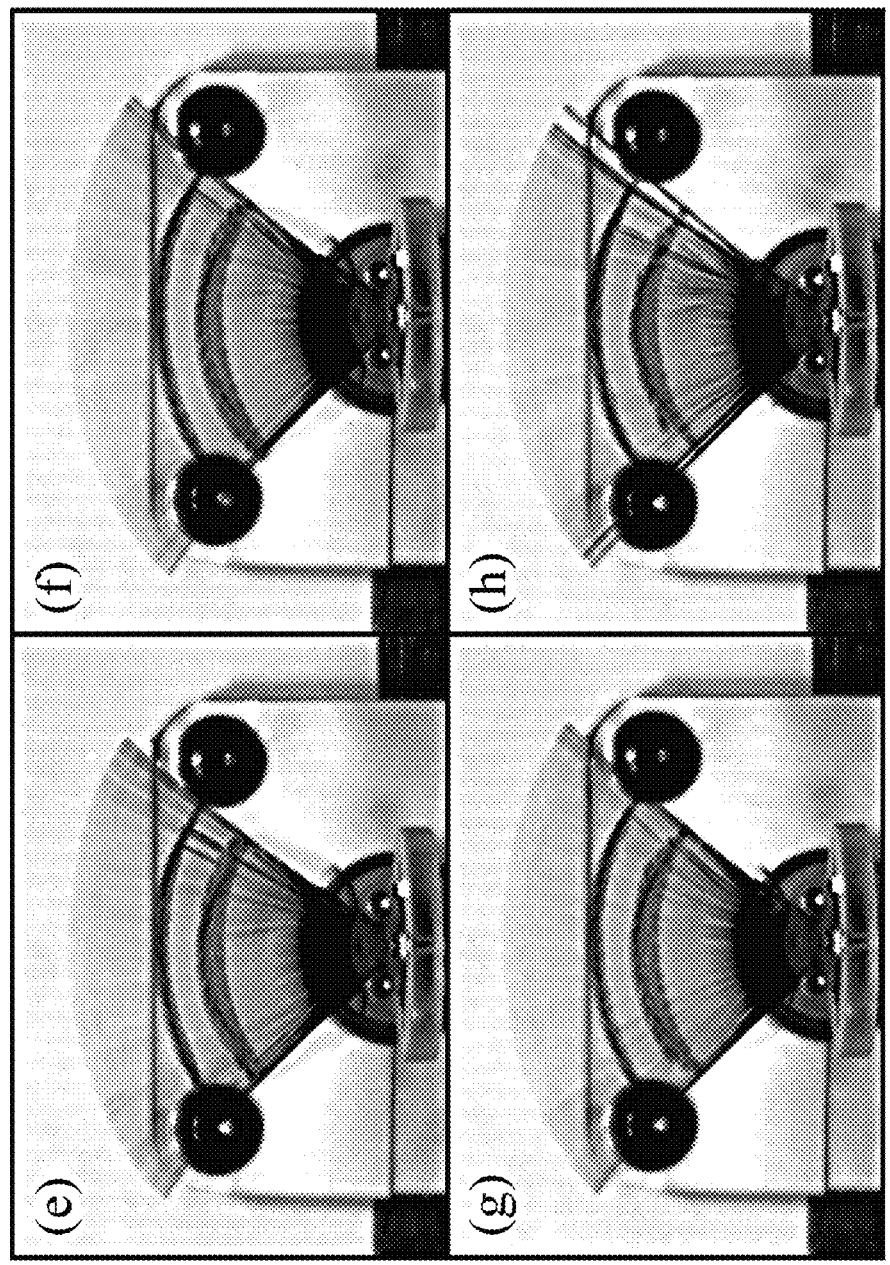

Referring to FIGS. 8a and 7h, which graphically depict the amplitude of the flapping wing 57 stroke during frequency response tests conducted with 14V supplied to the stator 61 and a first permanent magnet 63a and a second permanent magnet 63b (Spring 3 in FIG. 7b). Tests included two "tuning" phases for each flapping wing 57. In the initial phase, course frequency adjustments in the voltage waveform were automatically commanded by the microcontroller using preprogrammed increments of 5 Hz from 10 to 80 Hz in both ascending and descending direction. This allowed for a narrow range of frequencies to be identified at which the largest amplitude occurred based on observed behavior of the electromagnetic actuator 51. A series of composite images from this test is shown in FIGS. 8a-8h at increasing driving frequencies (specifically, FIG. 8a 45 Hz, 50 Hz for FIG. 8b, 55 Hz for FIG. 8c, 60 Hz for FIG. 8d, 65 Hz for FIG. 8e, 70 Hz for FIG. 8f, 75 Hz for FIG. 8g, and 80 Hz for FIG. 8h). At lower frequencies (FIGS. 8a, and 8b), small stroke amplitudes were observed and a typical step-like response behavior was exhibited. However, as frequency increased, the amplitude expanded and flapping wing 57 kinematics became smooth and harmonic, reaching maximum amplitude near resonance at images 8f and 8g. Small deviations in amplitude over a range of frequencies observed near resonance indicate a strong aerodynamic damping characteristic of the system.

Figure 9B:
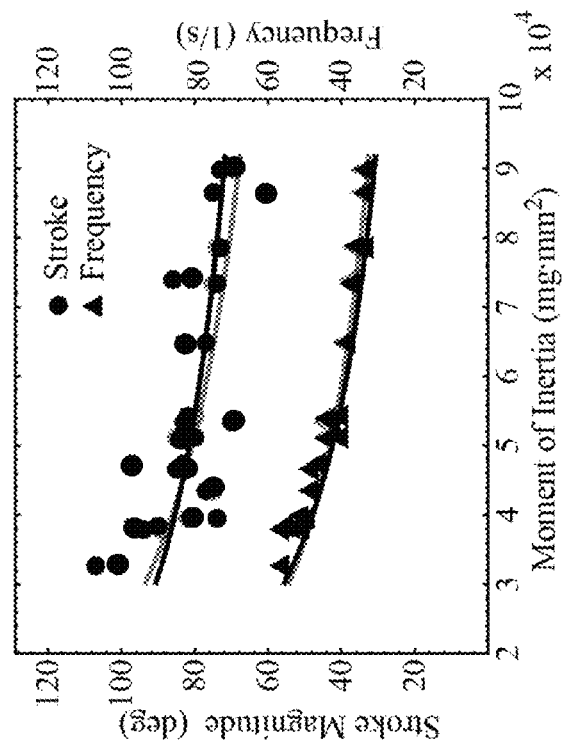
FIG. 9b is a graph showing theoretical and experimental resonant frequencies and pk-to-pk stroke amplitudes from sample flapping wings paired with the electromagnetic actuator.
Figure 9A:
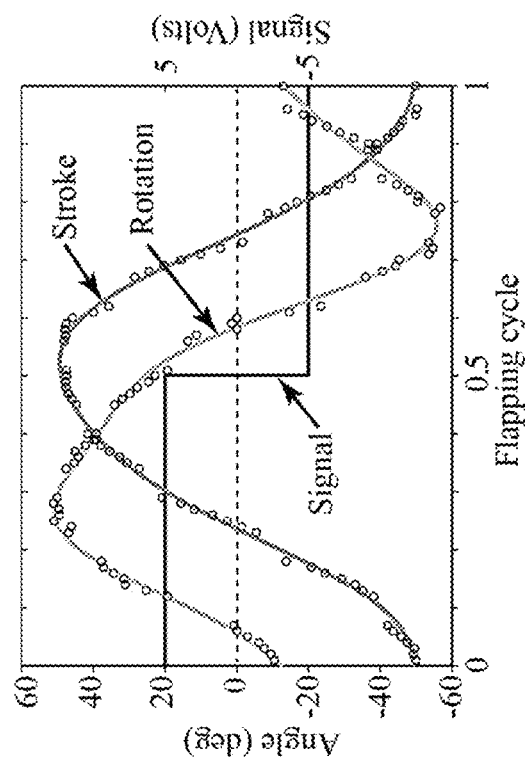
FIG. 9a is a graph showing experimental wing stroke and rotational kinematics, as well as the applied external excitation signal, of the flapping wing system operating at resonance fitted by third order Fourier series.

From the narrowed frequency bandwidth determined by initial tuning, frequency was then fine-tuned with the potentiometer until the maximum amplitude was found at resonance. FIG. 9a shows sample wing kinematics of wing #2 (from Table 1) operating at resonance. Smooth symmetric half cycles of the wing stroke are observed phase shifted by 90° from the alternating logic signal sent by a microcontroller, confirming the resonant mode of the electromagnetic actuator 51. Using the extracted flapping wing 57 kinematics, the maximum stroke amplitude and corresponding flapping frequency for each test flapping wing 57 was ascertained and used to construct a comparison plot to predict values using the total moment of inertia of the rotating assemble, FIG. 9b. Trend lines, representative of the data sets, show excellent agreement with predicted data. In a case by case comparison of the experimental and predicted values for resonance frequency and amplitude, an average error of 4.3% with 3.3% deviation and 7.2% with 5.3% deviation, respectively, was found, validating the accuracy of the approximate solution. Maximum stroke amplitudes for each wing are presented in Table 1 along with the experimentally determined resonance frequencies.

Figure 10:
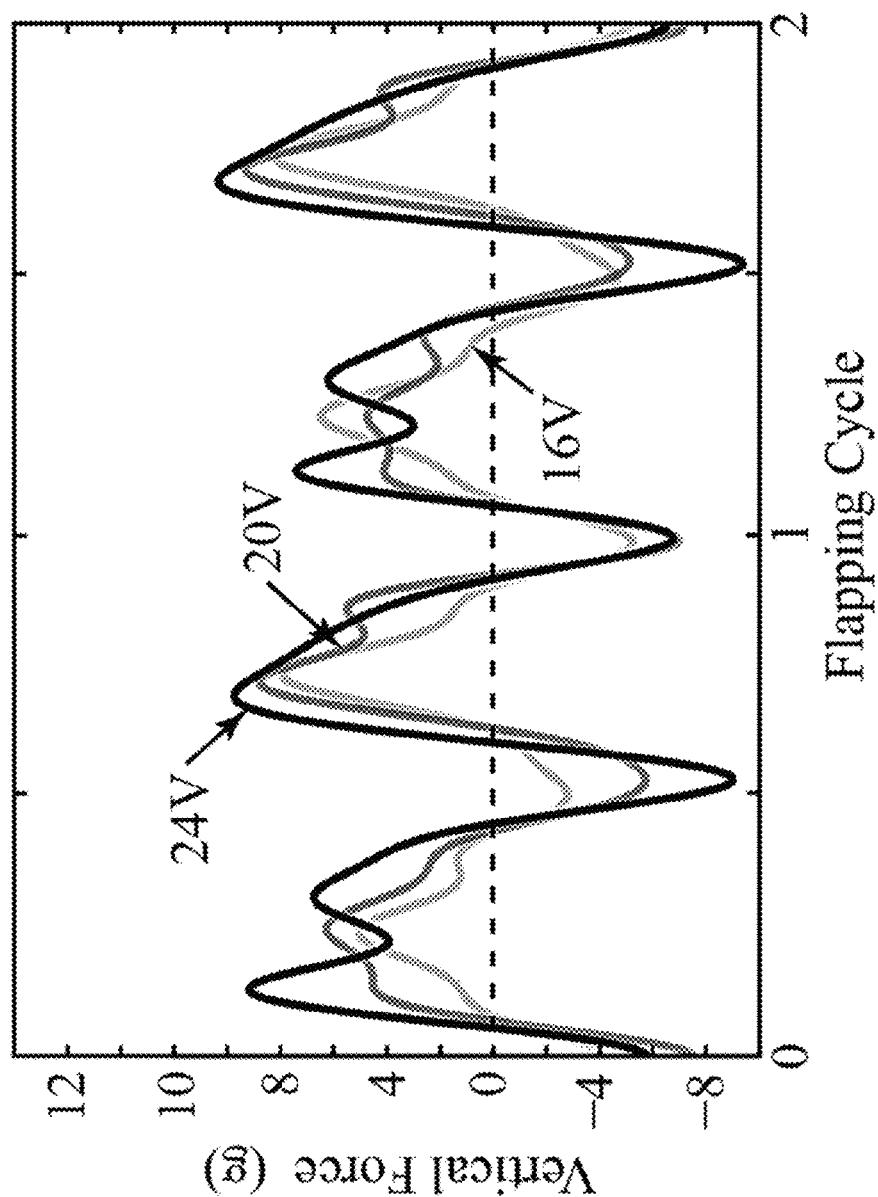
FIG. 10 is a graph showing instantaneous lift curves of the electromagnetic actuator operating at 71 Hz with 16, 20, and 24V supplied to the stator, low pass filtered at 350 Hz.

Instantaneous lift measurements for all 16 test flapping wing 57 were measured at their corresponding resonant frequency. A section of instantaneous force data corresponding steady-state flapping motion was then averaged to yield the mean lift generated and is presented in Table 1. Mean lift values ranging from 0.86 to 1.46 grams were found from flapping frequencies ranging from 33 to 56 hertz.

at 350 Hz. Mean lift values of 1.10 g, 1.87 g and 2.61 g were found at 16, 20, and 24 voltages, respectively, yielding lift-to-weight ratios just over one. A slight asymmetry between half cycles also existed, possible as result of asymmetry observed in the stroke kinematics (FIG. 10).

Estimates of efficiency, defined as the mechanical power produced by the electromagnetic actuator 51 to electrical power supplied to the stator 61, were determined from data collected during the frequency response experiments. Taking the product of the stroke-averaged torque and the mean angular velocity, an estimate of the mechanical power is determined by $P_m = \bar{\tau}_c(\Phi_m \omega/\pi)$. An expression for the stroke-averaged torque can be found by integrating experimentally determined magnetic coil stator 61 torque expression over $\pm \Phi_m/2$ to yield, $$\bar{\tau}_c = K_\tau \bar{I} \left(1 + \frac{a_m \Phi_m^2}{12}\right), \quad (19)$$

where $\bar{I}$ is the average current reported during testing. The supplied electrical power $P_s$ is calculated by the product of supplied voltage and the magnetic coil stator 61 current. The expression for the estimated efficiency is then given by, $$\eta = \frac{P_m}{P_s} = \frac{K_t \omega \Phi_m}{\pi V}\left(1 + \frac{a_m \Psi_m^2}{12}\right). \quad (20)$$

Figure 11:
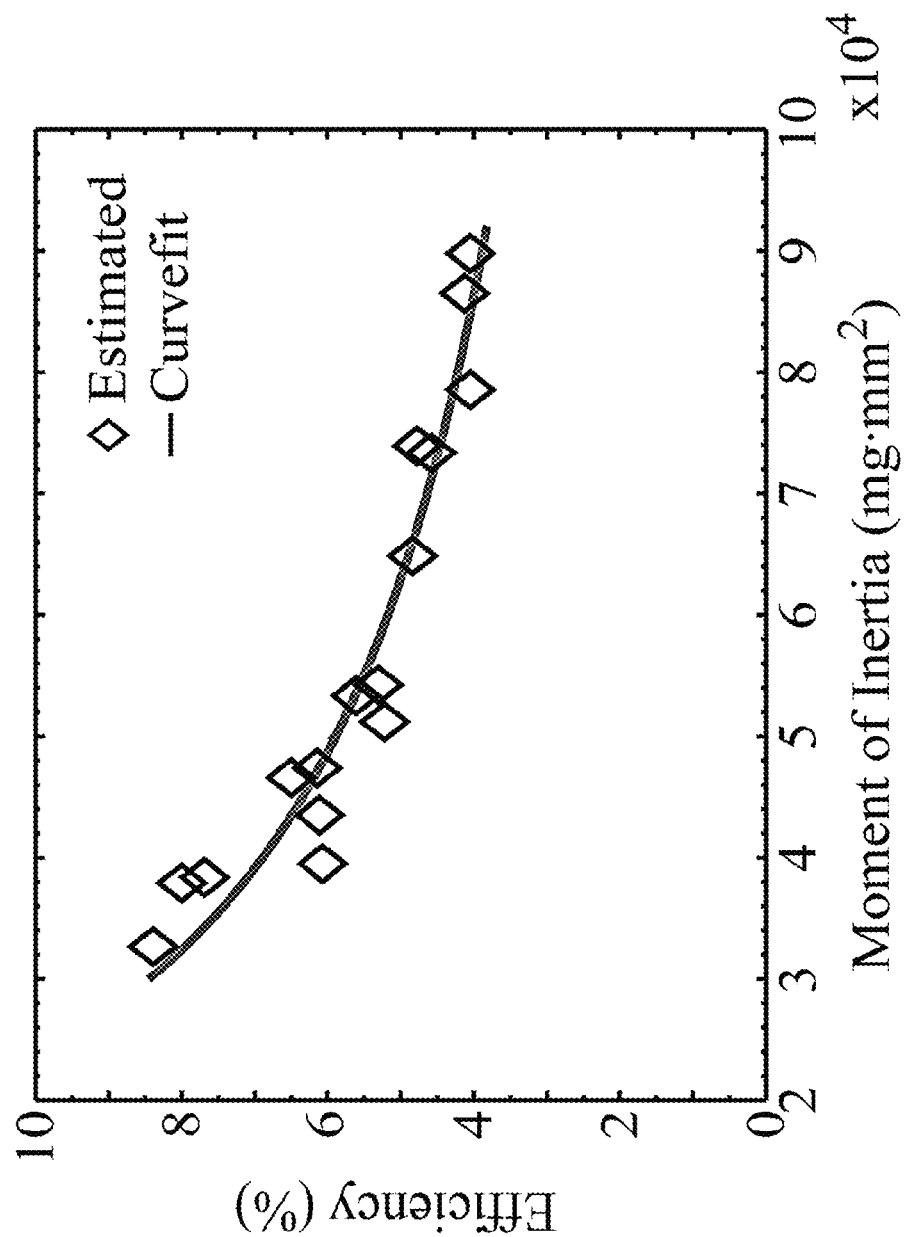
FIG. 11 is a graph showing the efficiency of the flapping wing system as a function of the total rotational moment of inertia.

FIG. 11 shows the efficiency as a function of the total moment of inertia, $I_{tot}$. Estimates of efficiency range from

TABLE I

TABLULATED MODEL & EXPERIMENTAL VALUES

| | Wing Morphology | | | | | | | | Predicted | | Measured | | | | |
|---|---|---|---|---|---|---|---|---|---|---|---|---|---|---|---|
| Wing ID | $M_w$ (mg) | $R_w$ (mm) | $\bar{c}$ (mm) | $I_w$ (mg·mm²) | $\hat{r}_1$ (m) | $\hat{r}_2$ (m) | $\hat{r}_2^2$ (S) | $\hat{r}_3^3$ (S) | $\omega_o$ (rad/s) | $\psi_m$ (deg) | $\omega_o$ (rad/s) | $\psi_m$ (deg) | Lift (g) | $P_m$ (Watts) | $\eta$ (%) |
| 1 | 51 | 45 | 12 | 37909 | 0.36 | 0.61 | 0.46 | 0.29 | 327 | 89 | 352 | 94 | 1.28 | 0.216 | 8.0 |
| 2 | 43 | 48 | 10 | 32669 | 0.34 | 0.58 | 0.26 | 0.17 | 352 | 101 | 352 | 107 | 1.46 | 0.242 | 8.4 |
| 3 | 53 | 48 | 10 | 38361 | 0.34 | 0.57 | 0.31 | 0.21 | 326 | 97 | 346 | 90 | 1.31 | 0.204 | 7.7 |
| 4 | 52 | 53 | 14 | 53341 | 0.38 | 0.60 | 0.41 | 0.31 | 276 | 70 | 264 | 83 | 1.01 | 0.148 | 6.1 |
| 5 | 50 | 56 | 10 | 51194 | 0.36 | 0.58 | 0.31 | 0.21 | 276 | 85 | 251 | 80 | 1.02 | 0.137 | 5.6 |
| 6 | 46 | 56 | 10 | 46601 | 0.36 | 0.57 | 0.30 | 0.21 | 295 | 82 | 302 | 85 | 1.41 | 0.171 | 5.2 |
| 7 | 49 | 56 | 10 | 43506 | 0.31 | 0.53 | 0.35 | 0.24 | 302 | 75 | 302 | 77 | 1.32 | 0.157 | 6.5 |
| 8 | 73 | 56 | 15 | 78559 | 0.37 | 0.59 | 0.40 | 0.29 | 226 | 74 | 207 | 73 | 0.86 | 0.105 | 6.1 |
| 9 | 47 | 57 | 9 | 54240 | 0.41 | 0.60 | 0.38 | 0.27 | 270 | 80 | 251 | 82 | 1.08 | 0.140 | 4.0 |
| 10 | 49 | 57 | 9 | 39491 | 0.31 | 0.51 | 0.27 | 0.18 | 326 | 82 | 308 | 74 | 1.03 | 0.154 | 7.0 |
| 11 | 54 | 57 | 9 | 64866 | 0.42 | 0.61 | 0.41 | 0.29 | 245 | 83 | 239 | 77 | 1.16 | 0.126 | 5.6 |
| 12 | 74 | 58 | 14 | 73363 | 0.34 | 0.54 | 0.33 | 0.24 | 232 | 75 | 232 | 74 | 1.01 | 0.118 | 5.3 |
| 13 | 62 | 63 | 11 | 73931 | 0.35 | 0.55 | 0.29 | 0.20 | 232 | 81 | 220 | 86 | 1.15 | 0.129 | 5.8 |
| 14 | 74 | 68 | 14 | 86511 | 0.32 | 0.50 | 0.34 | 0.24 | 214 | 61 | 207 | 75 | 1.10 | 0.107 | 4.8 |
| 15 | 75 | 69 | 13 | 108537 | 0.37 | 0.56 | 0.38 | 0.28 | 195 | 65 | 188 | 68 | 0.95 | 0.089 | 3.9 |
| 16 | 83 | 70 | 12 | 89795 | 0.31 | 0.47 | 0.29 | 0.20 | 214 | 69 | 207 | 73 | 1.11 | 0.105 | 4.6 |

In the previous tests force measurements were made with 14V applied to the stator 61 resulting in close to 0.14 A draw, much lower than the upper limit of the magnetic coil stator 61. Therefore, to gauge the upper performance levels of the electromagnetic actuator 51, the supply voltage was increased and the highest lift producing flapping wing 57 (Wing #2, Table 1) was reevaluated at resonance. To keep the maximum flapping amplitude within the designed range (120°), larger spring stiffness (spring #4 in FIG. 7b) was used. FIG. 10 shows instantaneous lift curves of the electromagnetic actuator 51 operating at 71 Hz with 16, 20, and 24V supplied to the magnetic coil stator 61, low pass filtered 8.5% at lowest moment of inertia to values of 4.0% at highest, indicating a strong correlation between the moment of inertia and the electromagnetic actuator 51 efficiency.

Attributes of this specific type of actuation offer several enhancements over traditional approaches. The unique use of an electromagnet coil lends itself to a near unlimited number of cross-sectional designs optimized to meet performance requirements while maintaining low costs of fabrication. The current coil used throughout testing showed near ideal maximum torque measurements when compared to the numerical simulations and prototypes of this form can be manufactured inexpensively by hand until a final form is iterated. Limited only by the contact at the central pivot pin used to tie the rotor to the actuator frame, system components are coupled solely by magnetic field interaction eliminating reliability concerns associated with mechanically linked designs.

As illustrated by Equation 8, a direct proportionality exists between the current and the strength of the magnetic field, as well as an inverse proportionality to the radial distance to the center of the coil, emphasizing the importance of the magnetic coil stator's 61 shape. This inverse proportionality also exists in the formulation of the spring torque model, were the radial distance of the permanent magnet pairs is shown to have a dramatic impact on the restoring torque acting on the rotor. These relationships introduce the significance that scalability effects have on the actuator's performance. Reinforcing these observations, mean lift production and efficiency are shown to increase with lower flapping wing 57 moment of inertia, therefore decreases in the size of the electromagnetic actuator 51 and flapping wing 57 would lead to an overall optimization of the system.

The design and analyzing principles were extended to investigate the feasibility of the proposed actuator at different scales and possibly find an optimal size that maximizes the actuator performance.

A predicative model for wing mass and moment of inertia is proposed. The optimization comprises two steps, in the first step, for specific rotor dimensions, the optimal radial length of the coil (H) that maximizes the lift-to-weight ratio was determined. In the 2nd step, the rotor dimensions are varied and the 1st step is repeated to find H. The lift-to-weight ratio $\eta$, a critical factor that determines the feasibility of the actuator.

Figure 12:
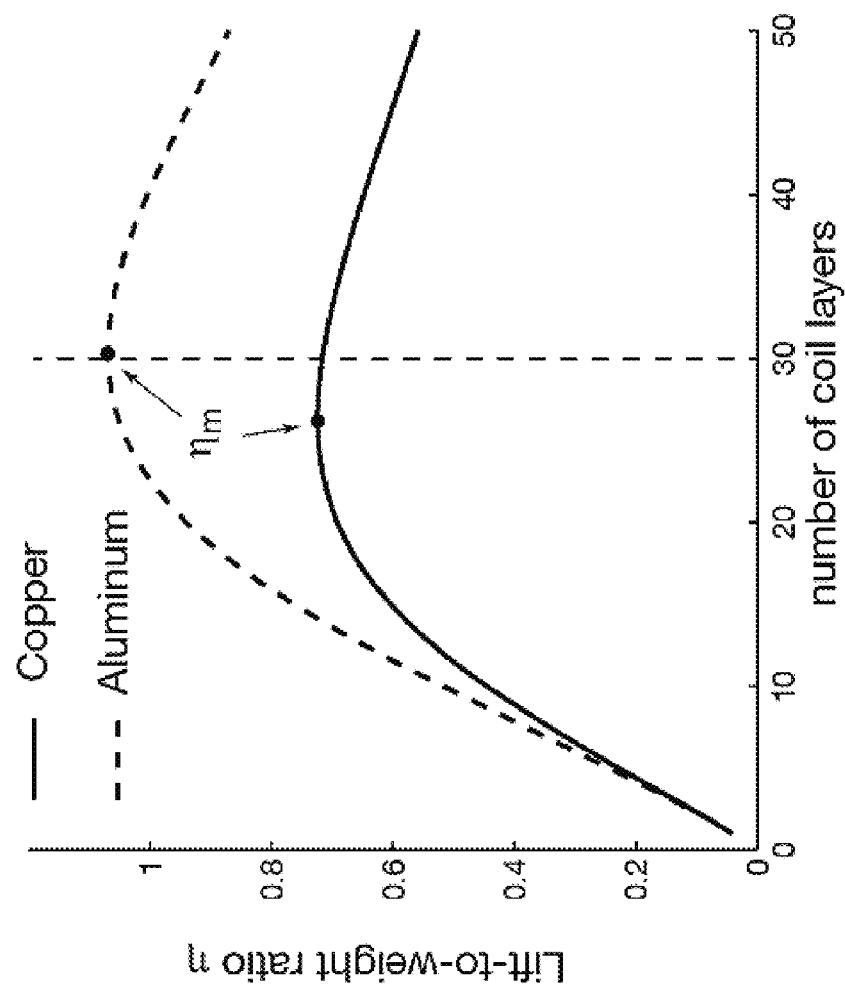
FIG. 12 is a plot of the lift-to-weight ratio as a function of stator size using both copper and aluminum magnetic wire windings.

FIG. 12 shows a plot of the lift-to-weight ratio $\eta$ as a function of magnetic coil stator 61 size. Two types of wire at AWG #40, copper and aluminum, are used. $\eta$ reaches maximum at $n_r=26$ and 30 for copper and aluminum respectively. Aluminum wire achieves significantly higher lift-to-weight ratios than copper wire because of its higher conductivity-to-weight ratio. Therefore, aluminum wire is used in the rest of the optimization. Note that the theoretical model shows that electromagnetic actuators 51 using copper wire cannot achieve a lift-to-weight ratio over one, however, the experimental results shows it does This is because of the underestimated aerodynamic lift by quasi-steady model, and therefore, the current results are conservative and higher $\eta$ may be achieved in practical applications.

FIGS. 13a-13l summarize the results of optimization (Lift-to-weight ratio as a function of wing scale ratio $\chi_w$ and magnetic coil stator 61 size ratio $\chi$). Lift-to-weight ratio is achieved in a large domain of parameter space, as it exceeds two when $\chi$ is less than 0.1 (FIG. 6A). Both actuator and wing dimensions have significant impact on $\eta_m$. In general, the smaller the electromagnetic actuator 51 dimension the higher the lift-to-weight that can be achieved. This indicates that significant improvement on the fabricated electromagnetic actuator 51 can be achieved by scaling it down.

The optimal flapping wing 57 length is about 8-12 times the rotor 69 length. Higher back EMF is created by smaller wings, as actuator efficiency and flapping frequency increases. the flapping frequency becomes significantly higher at smaller scale (e.g., $\chi_w<15$ and <0.4), as it exceeds the range of those observed in natural insects at similar scale. This may pose a potential problem of wear and overheating at the pivot joint, depending on the design and manufacturing techniques. However, for $15<\chi_w<25$ and $0.4<\chi<0.8$, good lift-to-weight ratio can still be achieved within a frequency range close to those of insects at similar scale, suggesting a more "insect-like" actuator.

Figure 13B:
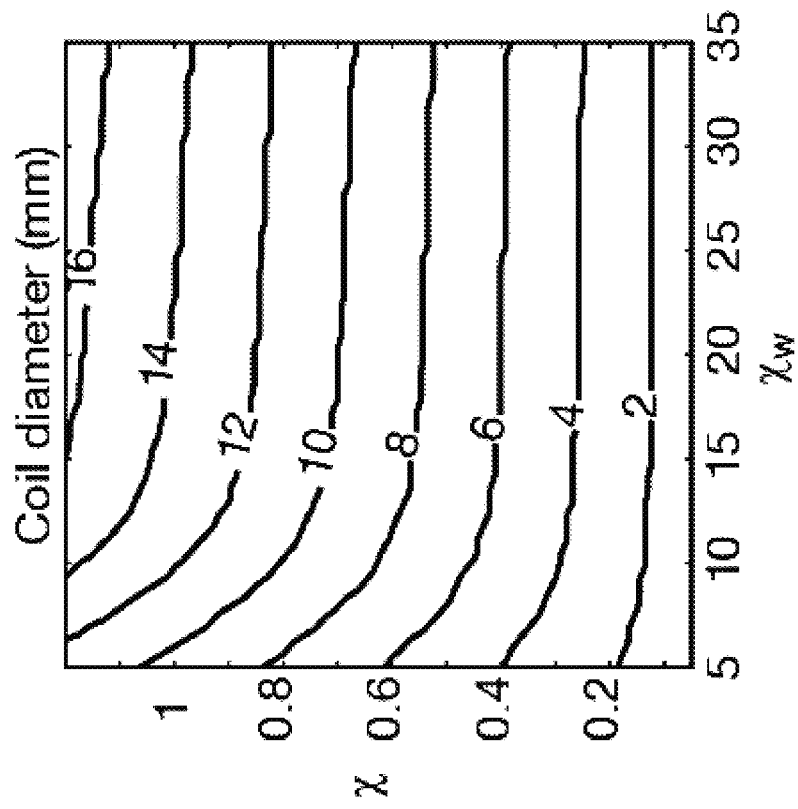
FIGS. 13a-13l are graphical summaries of the optimization results of the lift-to-weight ratio as a function of flapping wing scale ratios and stator scale ratios.
Figure 13A:
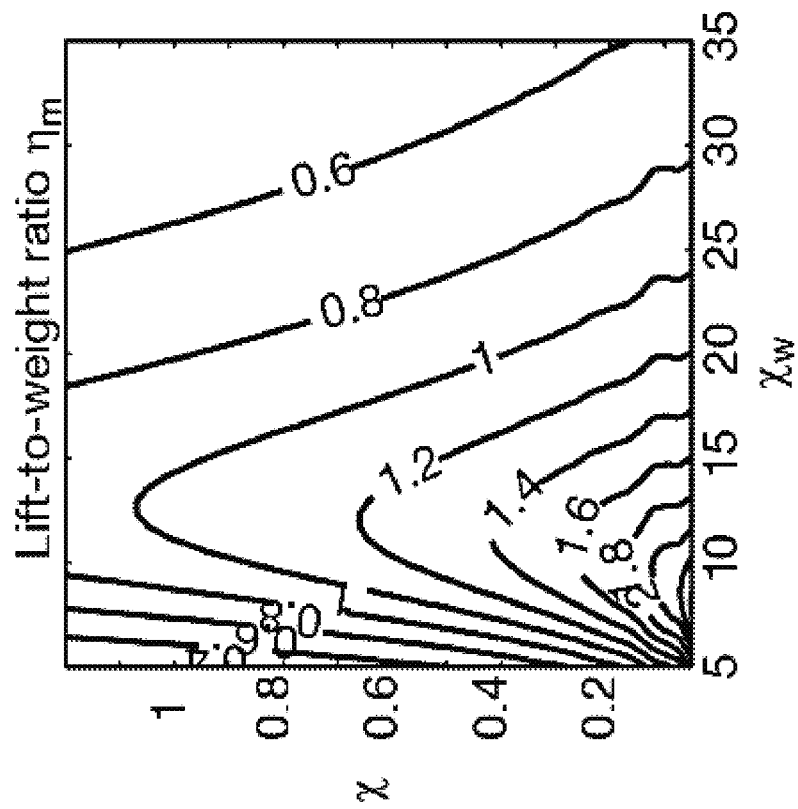
Figure 13D:
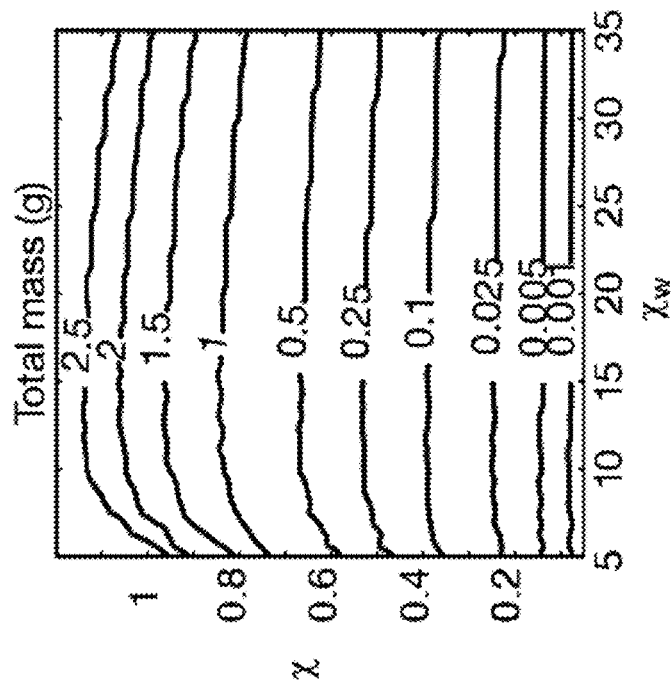
Figure 13C:
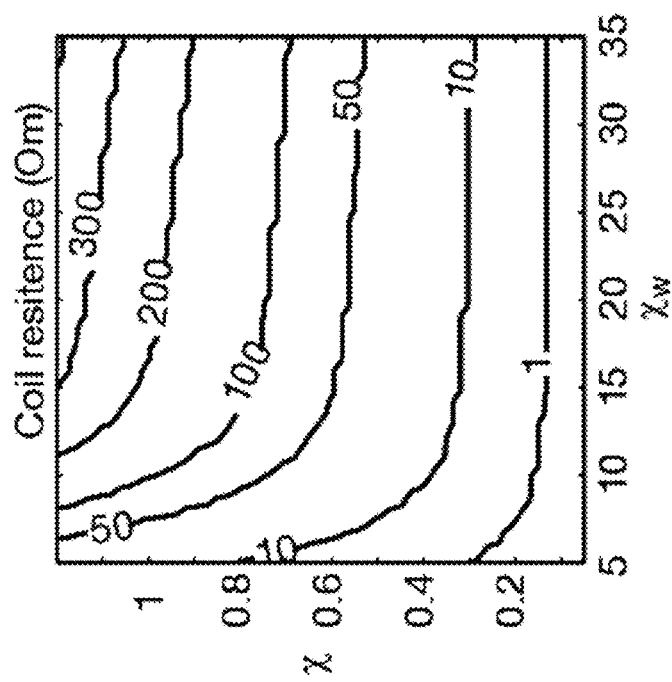
Figures 13E, 13F:
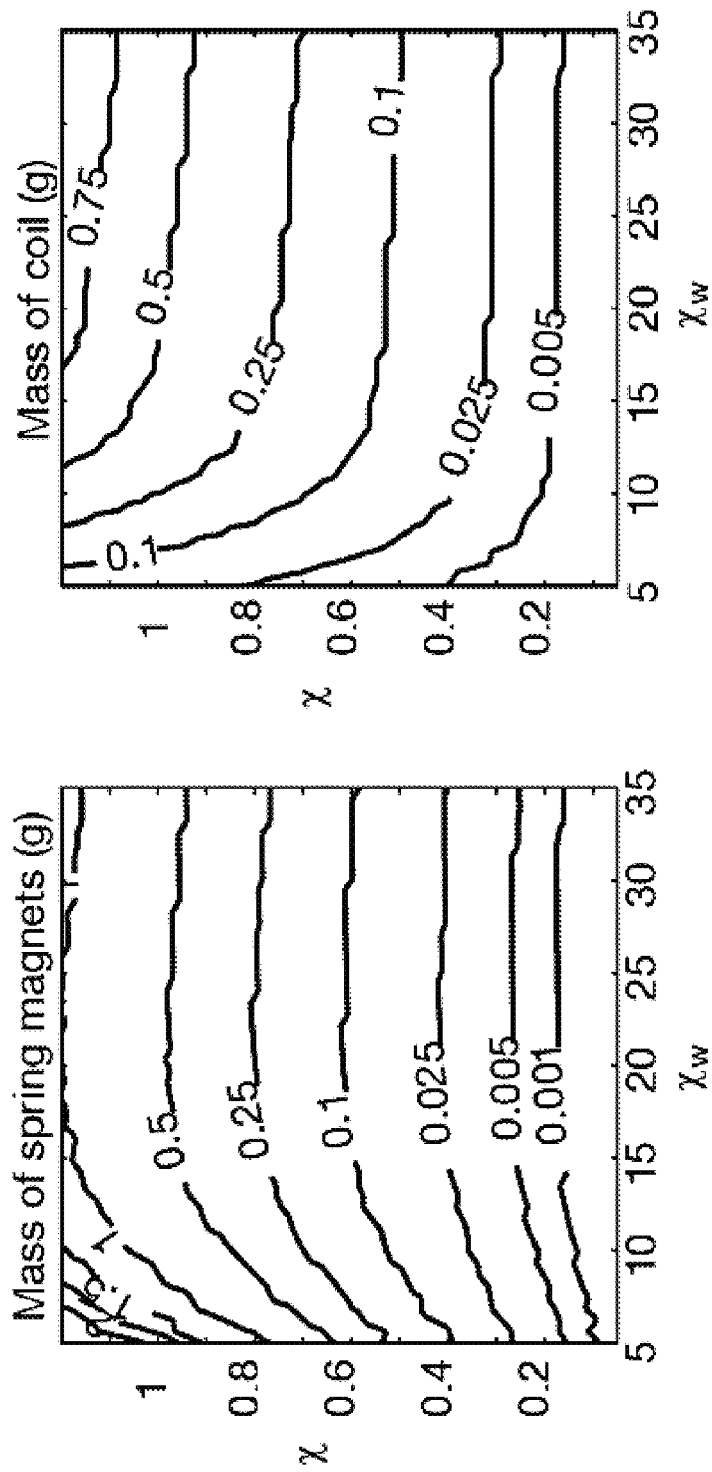
Figures 13G, 13H:
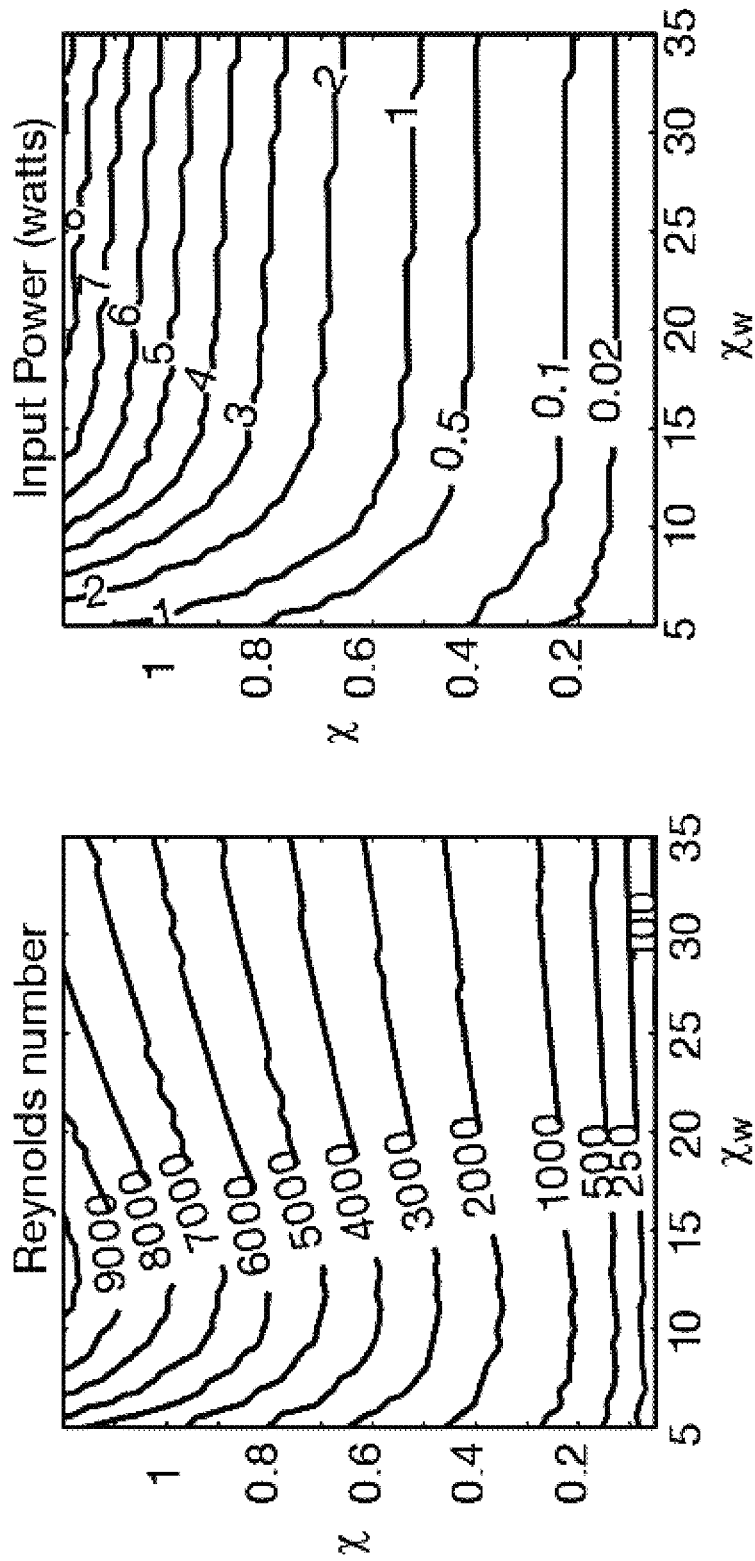
Figure 13J:
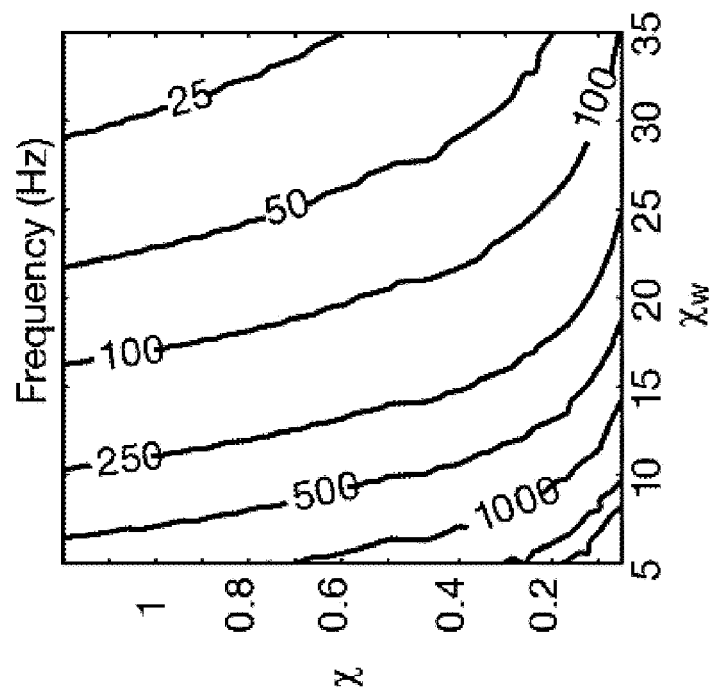
Figure 13I:
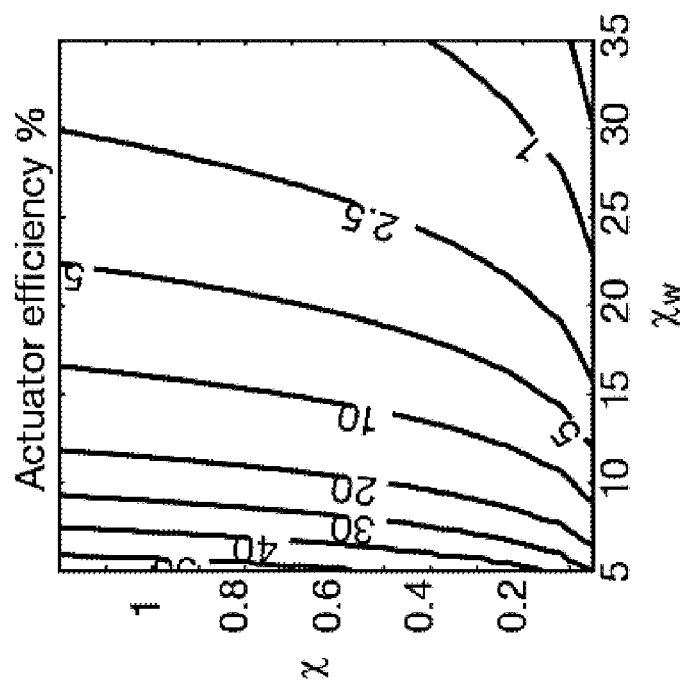
Figures 13K, 13L:
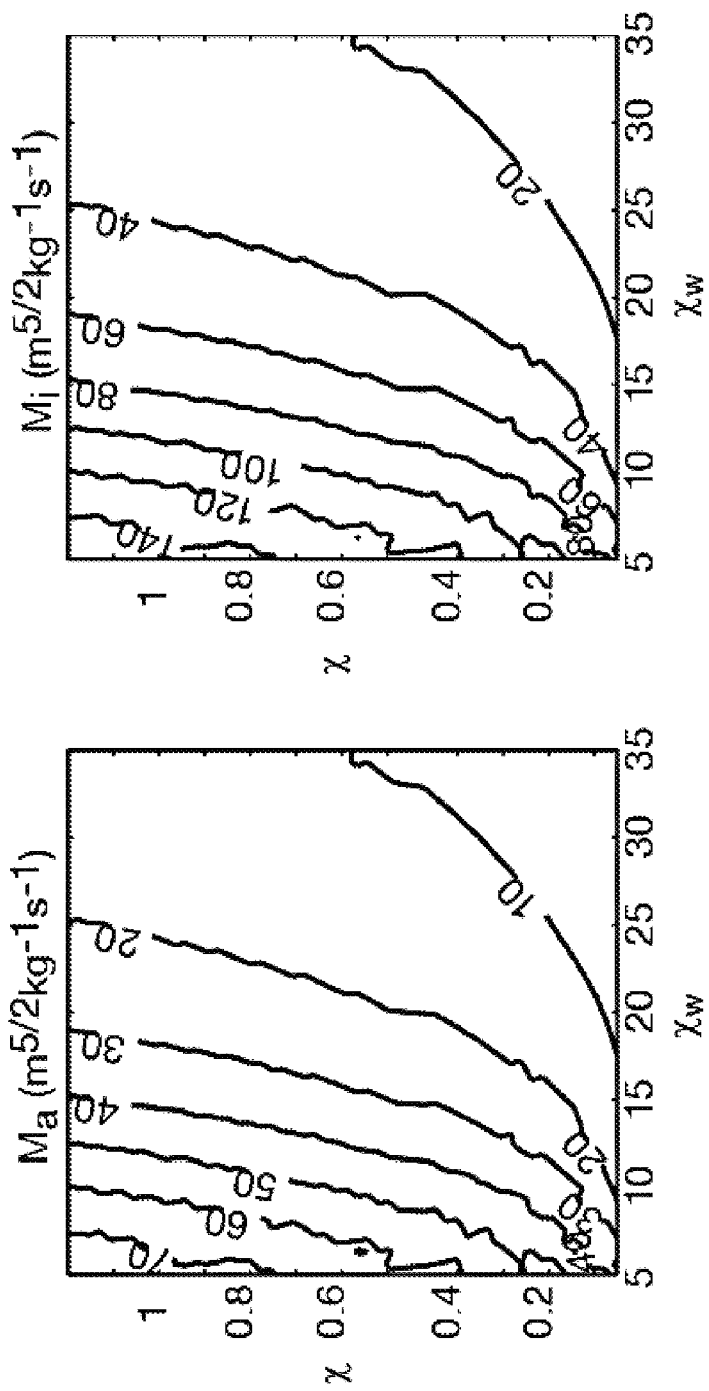

FIGS. 13k and 13l show the wing structural efficiency due to aerodynamic ($M_a$) and inertial ($M_i$) forces, respectively. As discussed previously, $M_a$ and $M_i$ measure the quality of the wing and determines how "good" the wing needs to be fabricated. Both quantities increase as wing length decreases, but still stay in a reasonable value compared to those calculated based on natural insects.

Those skilled in the art will recognize that numerous modifications can be made to the specific implementations described above. The implementations should not be limited to the particular limitations described. Other implementations may be possible.

The invention claimed is:

1. An electromagnetic actuator, comprising:
   an actuator frame;
   a rotor disposed within the actuator frame and configured to have direct rotational oscillation about a rotation axis following a predetermined rotational arc having a middle position and operatively within a predetermined oscillation frequency range;
   a stator having a coil for generating an electromagnetic force disposed within the actuator frame positioned proximate to the rotor and configured to remain stationary, combination of the stator and the rotor configured to generate a net driving torque between the rotor and the stator;
   at least one restoring element configured to provide a net counter torque to the rotor to bias the rotor to rotate to the middle position without mechanical coupling, wherein the at least one restoring element is in physical contact with the stator;
   at least one set of excitation terminals configured to provide potential energy to generate the net driving torque; and
   at least one actuating coupling having a proximal end and a distal end, the distal end configured to couple to at least one actuating member and the proximal end configured to couple to the rotor, motion of the rotor causing motion of the at least one actuating member thereby causing motion of the electromagnetic actuator, wherein the rotor includes at least one permanent magnet, and wherein the restoring element is at least one permanent magnet, and wherein the at least one permanent magnet of the restoring element is in a polarity alignment with the at least one permanent magnet of the rotor.

2. The electromagnetic actuator of claim 1, the potential energy is electrical.

3. The electromagnetic actuator of claim 1, the stator includes at least one winding.

4. The electromagnetic actuator of claim 1, the rotor includes at least one permanent magnet.

5. The electromagnetic actuator of claim 1, the restoring element is at least one permanent magnet.

6. The electromagnetic actuator of claim 1, the electromagnetic actuator is configured to be communicatively coupled to at least one sensor.

7. The electromagnetic actuator of claim 1, the restoring element is at least one permanent magnet.

8. A vehicle system, comprising:
   a vehicle frame;
   at least one electromagnetic actuator, positioned within the vehicle frame, the at least one electromagnetic actuator comprising:
   an actuator frame;

a rotor disposed within the actuator frame and configured to have direct rotational oscillation about a rotation axis following a predetermined rotational arc having a middle position and operatively within a predetermined oscillation frequency range;

a stator having a coil for generating an electromagnetic force disposed within the actuator frame positioned proximate to the rotor and configured to remain stationary, combination of the stator and the rotor configured to generate a net driving torque between the rotor and the stator;

at least one restoring element configured to provide a net counter torque to the rotor to bias the rotor to rotate to the middle position without mechanical coupling, wherein the at least one restoring element is in physical contact with the stator;

at least one set of excitation terminals configured to provide potential energy to generate the net driving torque; and at least one actuating coupling having a proximal end and a distal end, the distal end configured to couple to at least one actuating member and the proximal end configured to couple to the rotor, motion of the rotor causing motion of the at least one actuating member thereby causing motion of the electromagnetic actuator;

at least one actuating member, the at least one actuating member configured to couple to the actuating coupling; and a power source, the power source connected to the excitation terminals and providing potential energy to generate the net driving torque, wherein the rotor includes at least one permanent magnet, and wherein the restoring element is at least one permanent magnet, and wherein the at least one permanent magnet of the restoring element is in a polarity alignment with the at least one permanent magnet of the rotor.

9. The electromagnetic actuated vehicle system of claim 8, the at least one actuating coupling is configured to enable at least one degree of freedom motion in the at least one actuating member.

10. The electromagnetic actuated vehicle system of claim 8, the at least one actuating member is an element producing locomotion.

11. The electromagnetic actuated vehicle system of claim 8, the electromagnetic actuated vehicle system is configured to be communicatively coupled to at least one sensor.

12. The electromagnetic actuated vehicle system of claim 11, the at least one sensor comprises at least one sensor processing and coil drive circuitry unit.

13. The electromagnetic actuated aerial vehicle system of claim 12, the at least one sensor processing and coil drive circuitry unit is powered by an electrical source, the electrical source coupled to the frame.

14. The electromagnetic actuator of claim 8, the restoring element is at least one permanent magnet.

* * * * *